(12) United States Patent
Hayashi et al.

(10) Patent No.: US 11,054,398 B2
(45) Date of Patent: Jul. 6, 2021

(54) ULTRASONIC INSPECTION METHOD, ULTRASONIC INSPECTION DEVICE, AND COMPUTER-READABLE STORAGE MEDIUM

(71) Applicants: MITSUBISHI HEAVY INDUSTRIES, LTD., Tokyo (JP); NATIONAL UNIVERSITY CORPORATION EHIME UNIVERSITY, Ehime (JP)

(72) Inventors: Kyohei Hayashi, Tokyo (JP); Kazuyuki Nakahata, Ehime (JP); Masakazu Kamibayashi, Tokyo (JP)

(73) Assignees: MITSUBISHI HEAVY INDUSTRIES, LTD., Tokyo (JP); NATIONAL UNIVERSITY CORPORATION EHIME UNIVERSITY, Ehime (JP)

( * ) Notice: Subject to any disclaimer, the term of this patent is extended or adjusted under 35 U.S.C. 154(b) by 241 days.

(21) Appl. No.: 16/296,908

(22) Filed: Mar. 8, 2019

(65) Prior Publication Data

US 2019/0277807 A1   Sep. 12, 2019

(30) Foreign Application Priority Data

Mar. 8, 2018 (JP) .............................. JP2018-042160
Feb. 27, 2019 (JP) .............................. JP2019-034831

(51) Int. Cl.
*G01N 29/06* (2006.01)
*G01N 29/11* (2006.01)
(Continued)

(52) U.S. Cl.
CPC ......... *G01N 29/0654* (2013.01); *G01N 29/11* (2013.01); *G01N 29/262* (2013.01); *G01N 29/44* (2013.01); *G01N 2291/2634* (2013.01)

(58) Field of Classification Search
CPC ....... G01N 2291/2634; G01N 29/0654; G01N 29/11; G01N 29/262; G01N 29/44
See application file for complete search history.

(56) References Cited

U.S. PATENT DOCUMENTS 8,701,492 B2 * 4/2014 Mizota ................. G10K 11/345
73/603
10,024,824 B2   7/2018 Ten Grotenhuis et al.
(Continued)

FOREIGN PATENT DOCUMENTS

JP         6224594         11/2017

*Primary Examiner* — Francis C Gray
(74) *Attorney, Agent, or Firm* — Wenderoth, Lind & Ponack, L.L.P.

(57) ABSTRACT

An ultrasonic inspection method of scanning and inspecting an inspection object with ultrasonic waves includes collecting data obtained by scanning the inspection object with ultrasonic signals by using probes configured to transmit and receive the ultrasonic signals to and from the inspection object via a medium that propagates the ultrasonic signals; and processing and synthesizing the collected data. Synthesizing the data includes depicting an image including a surface of the inspection object in a region including pixels partitioned in a grid-like fashion based on the collected data of the ultrasonic signals, and extracting a pixel having maximum pixel intensity from the pixels arranged along a direction perpendicular to an extending direction of the surface of the inspection object in the depicted image to identify a position of the extracted pixel as a surface shape of the inspection object.

13 Claims, 11 Drawing Sheets

(51) Int. Cl.
 *G01N 29/44* (2006.01)
 *G01N 29/26* (2006.01)

(56) References Cited

U.S. PATENT DOCUMENTS

| | | | |
|---|---|---|---|
| 2005/0008215 A1* | 1/2005 | Shepard | G01N 25/72 382/141 |
| 2014/0200853 A1* | 7/2014 | Guan | G01N 29/069 702/189 |
| 2014/0238136 A1* | 8/2014 | Ten Grotenhuis | G01N 29/0654 73/592 |
| 2014/0278292 A1* | 9/2014 | Grellou | G06F 30/15 703/2 |
| 2015/0316513 A1* | 11/2015 | Grimard | G01N 29/4463 702/103 |
| 2017/0234838 A1 | 8/2017 | Ten Grotenhuis et al. | |

* cited by examiner

ULTRASONIC INSPECTION METHOD, ULTRASONIC INSPECTION DEVICE, AND COMPUTER-READABLE STORAGE MEDIUM

CROSS-REFERENCE TO RELATED APPLICATIONS

The present application claims priority to and incorporates by reference the entire contents of Japanese Patent Application No. 2018-042160 filed in Japan on Mar. 8, 2018 and Japanese Patent Application No. 2019-034831 filed in Japan on Feb. 27, 2019.

FIELD

The present invention relates to an ultrasonic inspection method, an ultrasonic inspection device, and a computer program.

BACKGROUND

In the related art, there is known a technique related to an inspection method of making various inspections of an inspection object by scanning the inspection object with ultrasonic signals. For example, Japanese Patent No. 6224594 discloses a method of acquiring data obtained by scanning a conduit as an inspection object with ultrasonic signals by the Full Matrix Capture (FMC) scanning using a plurality of probes, processing the acquired data using a waveform synthesis processing method such as the Total Focusing Method (TFM), and depicting the conduit in a scanning range to inspect a wall thickness of the conduit.

The method described in Japanese Patent No. 6224594 is a method of inspecting the wall thickness of the conduit. In this method, positions of surfaces of the conduit (a surface close to and a surface distant from a probe for ultrasonic inspection) are identified through data collection and processing by the FMC/TFM described above. However, a plurality of pieces of processing such as Canny edge detection, expansion of an edge, thinning processing, trimming of an erroneously recognized pixel, and horizontal end part approximation processing are performed to identify the surface position of the conduit, so that a time required for calculation is prolonged.

SUMMARY

An ultrasonic inspection method according to an aspect of the present invention is an ultrasonic inspection method of scanning and inspecting an inspection object with ultrasonic waves. The method includes collecting pieces of data obtained by scanning the inspection object with ultrasonic signals by using a plurality of probes configured to transmit the ultrasonic signals to the inspection object and receive the ultrasonic signals reflected from the inspection object via a medium that propagates the ultrasonic signals; and processing and synthesizing the collected pieces of data of the ultrasonic signals. Synthesizing the data includes depicting an image including a surface of the inspection object in a region including a plurality of pixels partitioned in a grid-like fashion based on the collected pieces of data of the ultrasonic signals, and extracting a pixel having maximum pixel intensity from the pixels arranged along a direction perpendicular to an extending direction of the surface of the inspection object in the depicted image to identify a position of the extracted pixel as a surface shape of the inspection object.

DETAILED DESCRIPTION

The following describes an embodiment of an ultrasonic inspection method, an ultrasonic inspection device, and a computer program according to the present invention in detail based on the drawings. The present invention is not limited to the embodiment.

First Embodiment

Figure 1:
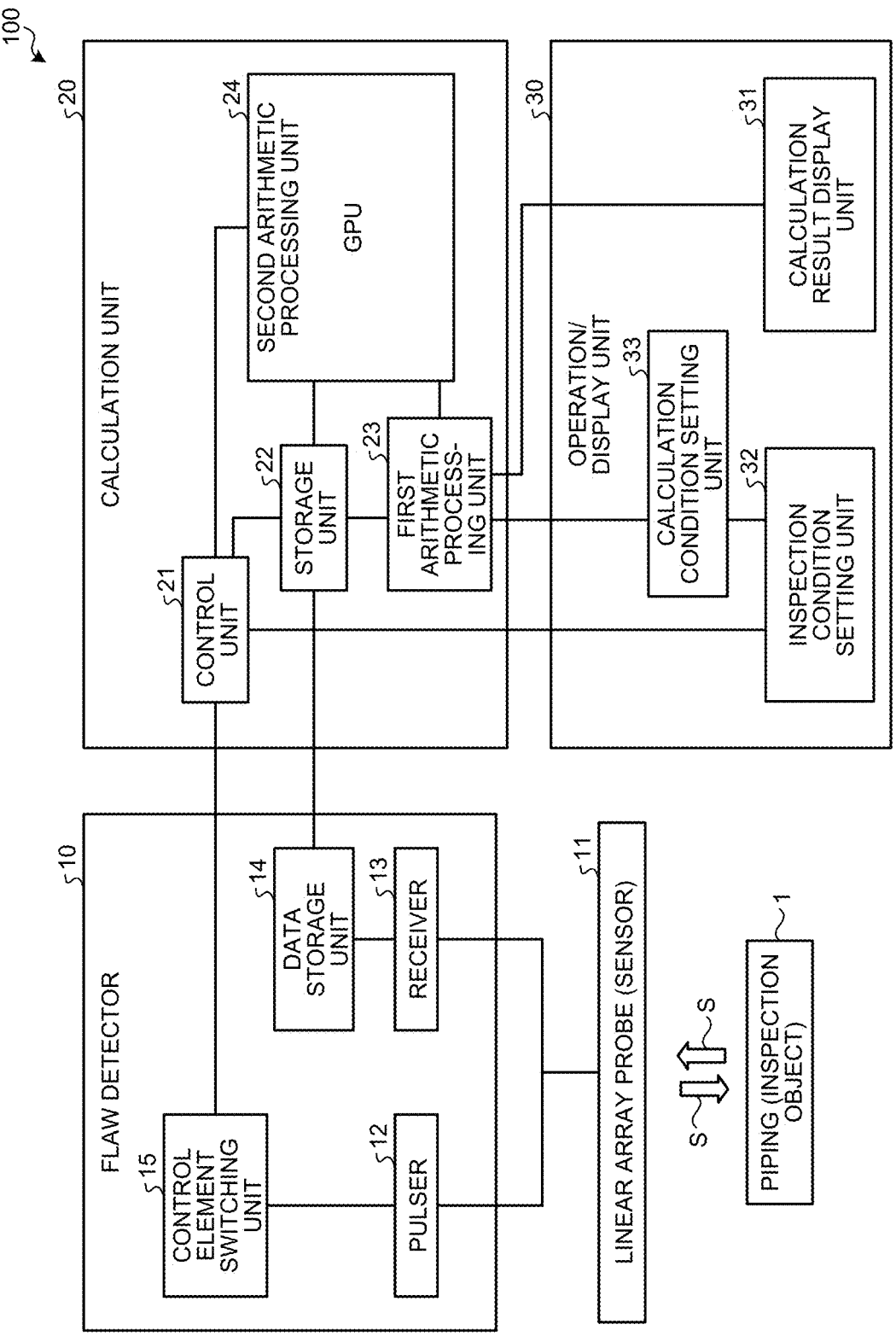
FIG. 1 is a block diagram illustrating a schematic configuration of an ultrasonic inspection device according to an embodiment.

FIG. 1 is a block diagram illustrating a schematic configuration of the ultrasonic inspection device according to the first embodiment. In the first embodiment, an inspection object is piping 1 in which pipes are connected to each other at a welding part 2 (refer to FIG. 2). The welding part 2 includes an excessive build-up portion protruding from a surface 1a of the piping 1 (refer to FIG. 2). The "surface 1a of the piping 1" also includes a surface of the welding part 2. An ultrasonic inspection device 100 according to the first embodiment is an inspection device (flaw detecting device) for inspecting the piping 1 as the inspection object to detect a defect of the welding part 2 including the excessive build-up portion.

As illustrated in FIG. 1, the ultrasonic inspection device 100 includes a flaw detector 10, a calculation unit 20, and an operation/display unit 30. The flaw detector 10 includes a linear array probe 11, a pulser 12, a receiver 13, a data storage unit 14, and a control element switching unit 15.

Figure 2:
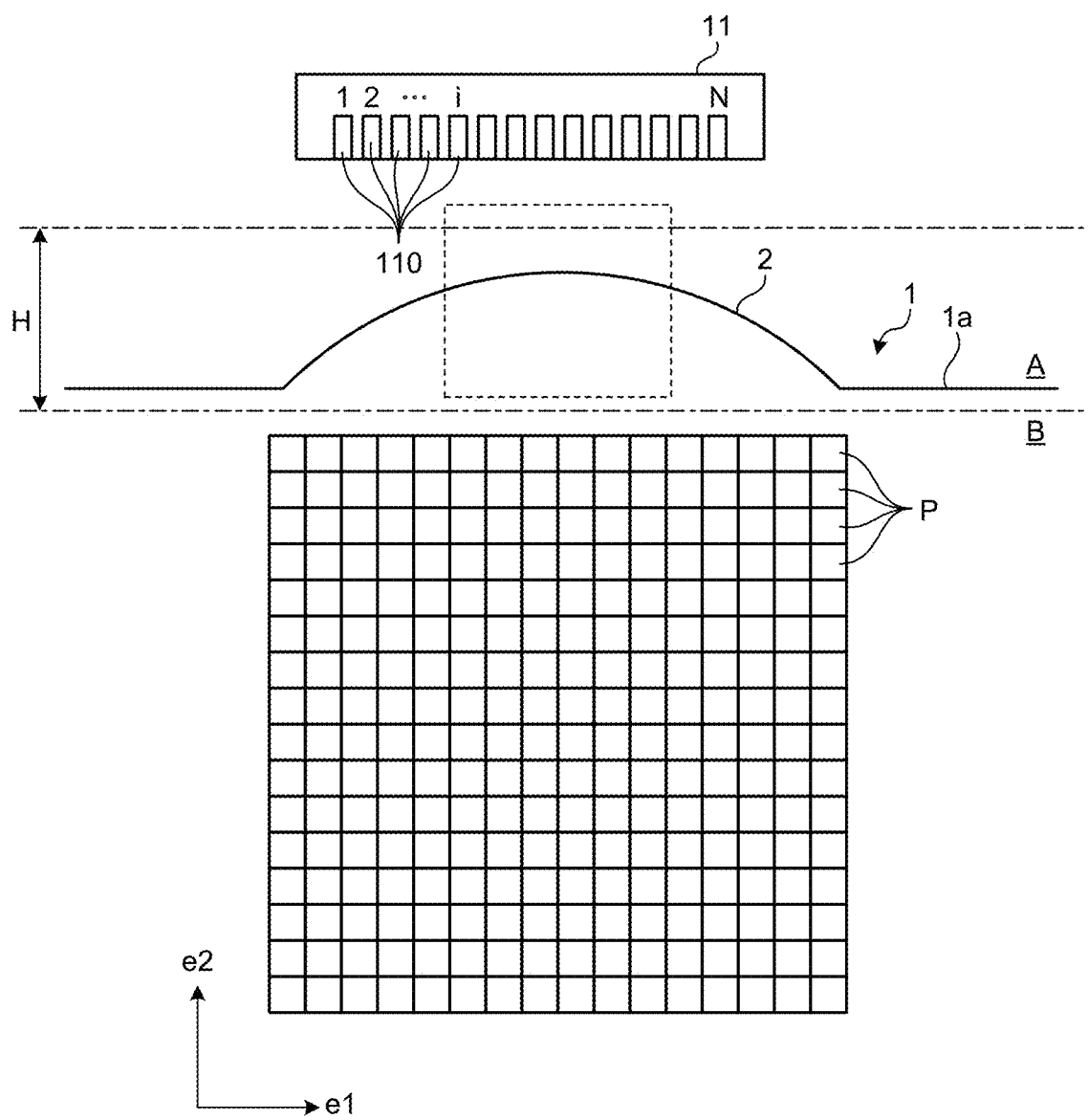
FIG. 2 is an explanatory diagram schematically illustrating part of a calculation region in which a second arithmetic processing unit performs data processing by the TFM.

The linear array probe 11 includes a plurality of (N) probes 110 (refer to FIG. 2). In the first embodiment, the probes 110 are arranged in a linear array. An arrangement configuration of the probes 110 is not limited thereto. In the following description, the i-th (i is an integral number from 1 to N) probe 110 is referred to as a probe 110i. Each of the probes 110 is connected to the pulser 12 as a transmitter and the receiver 13 as a receiver. A space between the probe 110 and the piping 1 as the inspection object is filled with a medium that can propagate an ultrasonic signal S. As denoted by a void arrow in FIG. 1, each of the probes 110 transmits the ultrasonic signal S transmitted from the pulser 12 to the welding part 2 of the piping 1 as the inspection object via the medium. Each of the probes 110 receives the ultrasonic signal S reflected from the welding part 2 of the piping 1 via the medium, and transmits the ultrasonic signal S to the receiver 13. The ultrasonic signal S transmitted to the receiver 13 is stored in the data storage unit 14. In accordance with an instruction from a control unit 21 of the calculation unit 20 (described later), the control element switching unit 15 switches one of the probes 110 to another that transmits the ultrasonic signal S from the pulser 12.

The medium filled in the space between the probe 110 and the piping 1 as the inspection object may be any medium that can propagate ultrasonic waves. As the medium, for example, ultrasonic transmission gel, water, or the like can be used. In a case of using the ultrasonic transmission gel as the medium, for example, by pressing a pocket of the ultrasonic transmission gel against the surface of the piping 1 with appropriate force, the ultrasonic transmission gel is deformed corresponding to the shape of the welding part 2 even if the welding part 2 has a complicated shape. Due to this, the space between the piping 1 and the linear array probe 11 can be filled with the medium without a gap. In this case, for simplifying the explanation, it is assumed that the space between the probe 110 and the piping 1 is filled with a single medium. Accordingly, the ultrasonic signal S is propagated via the medium between the linear array probe 11 and the piping 1.

In the first embodiment, the calculation unit 20 is an arithmetic processing device that is disposed separately from the flaw detector 10, and connected to the flaw detector 10. The calculation unit 20 is, for example, a personal computer that is externally connected. The calculation unit 20 and the flaw detector 10 may be integrally disposed. The calculation unit 20 includes the control unit 21, a storage unit 22, a first arithmetic processing unit 23, and a second arithmetic processing unit 24.

The control unit 21 is, for example, an arithmetic processing device constituted of a central processing unit (CPU) or the like. The control unit 21 is connected to the control element switching unit 15 of the flaw detector 10, the storage unit 22, the second arithmetic processing unit 24, and an inspection condition setting unit 32 of the operation/display unit 30 (described later). The control unit 21 loads a computer program stored in the storage unit 22 into a memory, and executes a command included in the computer program. More specifically, the control unit 21 acquires, from the inspection condition setting unit 32, information of an inspection condition set by a user. The control unit 21 controls the control element switching unit 15 to cause the ultrasonic signals S to be successively transmitted from the respective probes 110 of the linear array probe 11 to the piping 1 as the inspection object based on the acquired information of the inspection condition, and collects data of the ultrasonic signals S reflected from the piping 1. When the data collection by what is called the Full Matrix Capture (hereinafter referred to as "FMC") ends, the control unit 21 commands the second arithmetic processing unit 24 to execute various kinds of processing on the collected data.

In the first embodiment, the method of the FMC is used for collecting the data of the ultrasonic signals S. The FMC is a data collection method of repeating a procedure of receiving the ultrasonic signals S emitted from probes (transducers) 110 in one linear array probe 11 and reflected from the inspection object by all the probes (transducers) 110 multiple times corresponding to the number of elements, and acquiring transmission and reception data of all the probes (transducers) 110 in one linear array probe 11. More specifically, the control unit 21 causes the ultrasonic signal S to be transmitted from one of the probes 110 of the linear array probe 11 to the piping 1. The ultrasonic signal S reflected from the piping 1 is received by each of the probes 110, and stored in the data storage unit 14 via the receiver 13. At this point, if the number of probes 110 in the linear array probe 11 is N, N pieces of data are stored in the data storage unit 14 for the ultrasonic signal S reflected from the piping 1. Next, the control unit 21 similarly causes the ultrasonic signal S to be transmitted from a probe 110 different from (for example, adjacent to) the probe 110 from which the ultrasonic signal S is generated at a previous timing. As a result, N pieces of data are newly stored in the data storage unit 14 for the ultrasonic signal S reflected from the piping 1. This processing is repeated until the ultrasonic signal S is transmitted from all of the N probes 110. As a result, N×N pieces of matrix data are stored in the data storage unit 14 for the ultrasonic signal S reflected from the piping 1. The N×N pieces of matrix data for the ultrasonic signal S is data obtained by scanning the piping 1 with the ultrasonic signal S.

The storage unit 22 stores therein data (computer program) required for various kinds of processing performed by the ultrasonic inspection device 100. The storage unit 22 is, for example, a semiconductor memory device such as a random access memory (RAM), a read only memory (ROM), and a flash memory, or a storage device such as a hard disk and an optical disc. Such storage devices include a computer-readable storage medium on which the program is stored in computer-installable file format or computer-executable file format. The storage unit 22 is connected to the data storage unit 14 of the flaw detector 10, the first arithmetic processing unit 23, and the second arithmetic processing unit 24. The storage unit 22 receives, from the data storage unit 14, the N×N pieces of data of the ultrasonic signal S collected by the FMC described above and stores the received data. The storage unit 22 transmits the stored data of the ultrasonic signals S to the first arithmetic processing unit 23 and the second arithmetic processing unit 24 in response to a request from them.

The first arithmetic processing unit 23 is, for example, an arithmetic processing device constituted of a CPU. The first arithmetic processing unit 23 is connected to the storage unit 22, the second arithmetic processing unit 24, and a calculation condition setting unit 33 and a calculation result display unit 31 of the operation/display unit 30. The first arithmetic processing unit 23 loads the computer program stored in the storage unit 22 into the memory, and executes a command included in the computer program. The first arithmetic processing unit 23 acquires, from the calculation condition setting unit 33, information of a calculation condition that is set based on the inspection condition. The first arithmetic processing unit 23 transmits the acquired calculation condition to the second arithmetic processing unit 24. The first arithmetic processing unit 23 transmits a result calculated by the second arithmetic processing unit 24 to the calculation result display unit 31.

The second arithmetic processing unit 24 is an arithmetic processing device constituted of a graphics processing unit (GPU). The second arithmetic processing unit 24 is connected to the control unit 21, the storage unit 22, and the first arithmetic processing unit 23. In the first embodiment, the second arithmetic processing unit 24 also performs processing other than image creation processing with the GPU by using what is called a GPGPU. Due to this, a calculation speed can be improved. At least one GPU is required, but a plurality of GPUs can be used in parallel. The second arithmetic processing unit 24 receives, from the storage unit 22, the N×N pieces of data of the ultrasonic signals S collected by the FMC described above. The second arithmetic processing unit 24 processes and synthesizes the N×N pieces of data of the ultrasonic signals S, that is, the pieces of data obtained by scanning the piping 1 by using the Total Focusing Method (hereinafter referred to as "TFM") in accordance with a command from the control unit 21 and the information of the calculation condition from the first arithmetic processing unit 23, and creates a calculation result of depicting the inner part of the piping 1 based on a synthesis result. The TFM is various methods of analyzing the data of the ultrasonic signals S collected by the FMC to synthesize the ultrasonic signals S. Details about the TFM used in the ultrasonic inspection method according to the first embodiment will be described later.

FIG. 2 is an explanatory diagram schematically illustrating part of a calculation region in which the second arithmetic processing unit performs data processing by the TFM. In the following description including FIG. 2, the calculation region is described as a two-dimensional region for simplification, but actual calculation is performed in a three-dimensional region. FIG. 2 illustrates an example in which the probes 110 of the linear array probe 11 are arranged in a line, but the arrangement configuration of the probes 110 is not limited thereto. As illustrated in FIG. 2, in the calculation region partitioned in a grid-like fashion including a plurality of pixels P, the second arithmetic processing unit 24 performs processing of synthesizing N×N amplitude values of the ultrasonic signals S collected by the FMC, using the TFM for each of the pixels P. In the first embodiment, the pixels P are partitioned in a grid-like fashion along a direction e1 as an extending direction of the surface 1a of the piping 1 as the inspection object (a horizontal direction in FIG. 2), and a direction e2 as a direction perpendicular to the extending direction of the surface 1a of the piping 1 (a vertical direction in FIG. 2). The pixels P illustrated in FIG. 2 represent part of the calculation region. Actually, not only the inside region of the piping 1 but also the region between the linear array probe 11 and the piping 1 is the calculation region partitioned into the pixels P in the same manner. In the second arithmetic processing unit 24 according to the first embodiment, one core is assigned to each unit voxel (not illustrated) including a plurality of pixels P. The second arithmetic processing unit 24 performs calculation processing by the TFM for each unit voxel in parallel, and creates a calculation result of depicting the inner part of the piping 1. The second arithmetic processing unit 24 transmits the created calculation result to the first arithmetic processing unit 23.

The operation/display unit 30 is a device having both of a display function for displaying an inspection result and an input operation function as a user interface. As the operation/display unit 30, for example, a touch panel display can be used. In the first embodiment, the operation/display unit 30 is disposed separately from the flaw detector 10, and connected to the calculation unit 20. The operation/display unit 30 may be disposed integrally with the flaw detector 10. The operation/display unit 30 is not limited to the touch panel display, and may be configured to separate the display function for displaying the inspection result and the operation function as the user interface.

As illustrated in FIG. 1, the operation/display unit 30 includes the calculation result display unit 31, the inspection condition setting unit 32, and the calculation condition setting unit 33. The calculation result display unit 31 is connected to the first arithmetic processing unit 23 of the calculation unit 20. The calculation result display unit 31 displays, to the user, the calculation result calculated by the second arithmetic processing unit 24 and received from the first arithmetic processing unit 23, that is, a depicting result of the inner part of the piping 1. The inspection condition setting unit 32 is a user interface through which the user sets the inspection condition. The inspection condition includes, for example, information such as the arrangement configuration of the probes 110 of the linear array probe 11 and a type of the medium. The inspection condition also includes, for example, information such as the fact that the inspection object is the welding part 2 of the piping 1, a size (wall thickness) of the piping 1, and a type of material constituting the piping 1. The calculation condition setting unit 33 sets the calculation condition based on the inspection condition input by the user, and transmits the calculation condition to the first arithmetic processing unit 23 of the calculation unit 20. The calculation condition is various conditions required for performing arithmetic processing by the second arithmetic processing unit 24 in accordance with the information of the inspection condition described above. The calculation condition includes, for example, information of the calculation region the part of which is schematically illustrated with the pixels P in FIG. 2.

Figure 3:
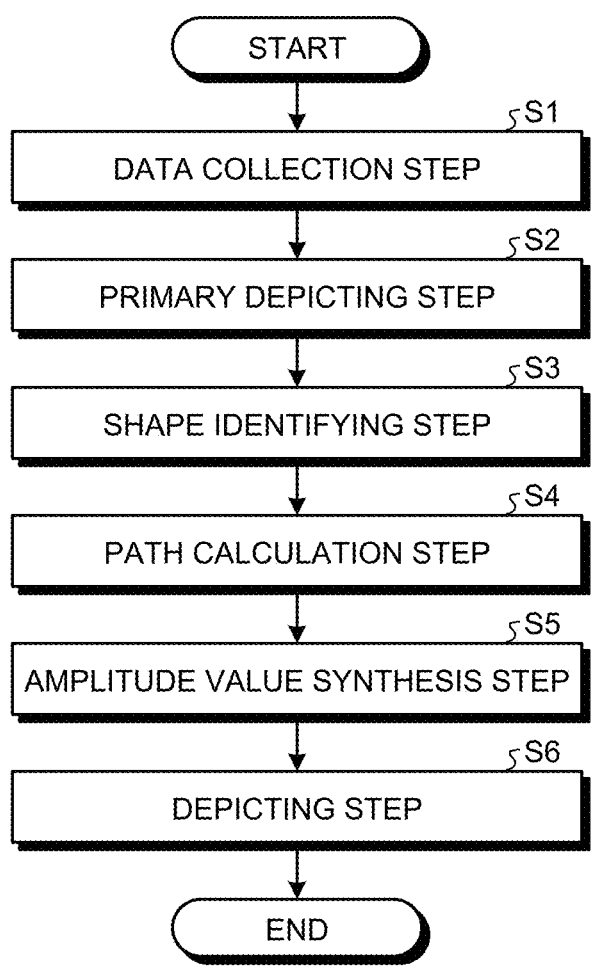
FIG. 3 is a flowchart illustrating a processing procedure of an ultrasonic inspection method according to the embodiment.

Next, in the following, a processing procedure of the ultrasonic inspection method according to the first embodiment is described. FIG. 3 is a flowchart illustrating the processing procedure of the ultrasonic inspection method according to the first embodiment. The processing procedure illustrated in FIG. 3 is performed when the control unit 21, the first arithmetic processing unit 23, and the second arithmetic processing unit 24 of the calculation unit 20 execute the computer program stored in the storage unit 22. The processing procedure illustrated in FIG. 3 is performed in a state in which the flaw detector 10 is positioned at a predetermined position on the welding part of the piping 1.

At Step S1, the calculation unit 20 performs a data collection step (data collection processing) by the control unit 21. The data collection step is a step of scanning the piping 1 as the inspection object with the ultrasonic signals by the FMC. As described above, the control unit 21 performs, for all the probes 110, the procedure of receiving the ultrasonic signal transmitted from one probe 110 and reflected from the inspection object. Due to this, N×N pieces of matrix data are stored in the data storage unit 14 for the ultrasonic signal reflected from the piping 1, that is, the data obtained by scanning the piping 1.

Next, the calculation unit 20 performs processing at Step S2 to Step S5 as a data synthesis step of processing and synthesizing the data of the ultrasonic signals S collected at the data collection step by the TFM. The processing at Step S2 to Step S5 is performed by the second arithmetic processing unit 24 in accordance with a command from the control unit 21 of the calculation unit 20. As described above, the processing at Step S2 to Step S5 is performed by the second arithmetic processing unit 24 for each assigned unit voxel in parallel.

Figure 4:
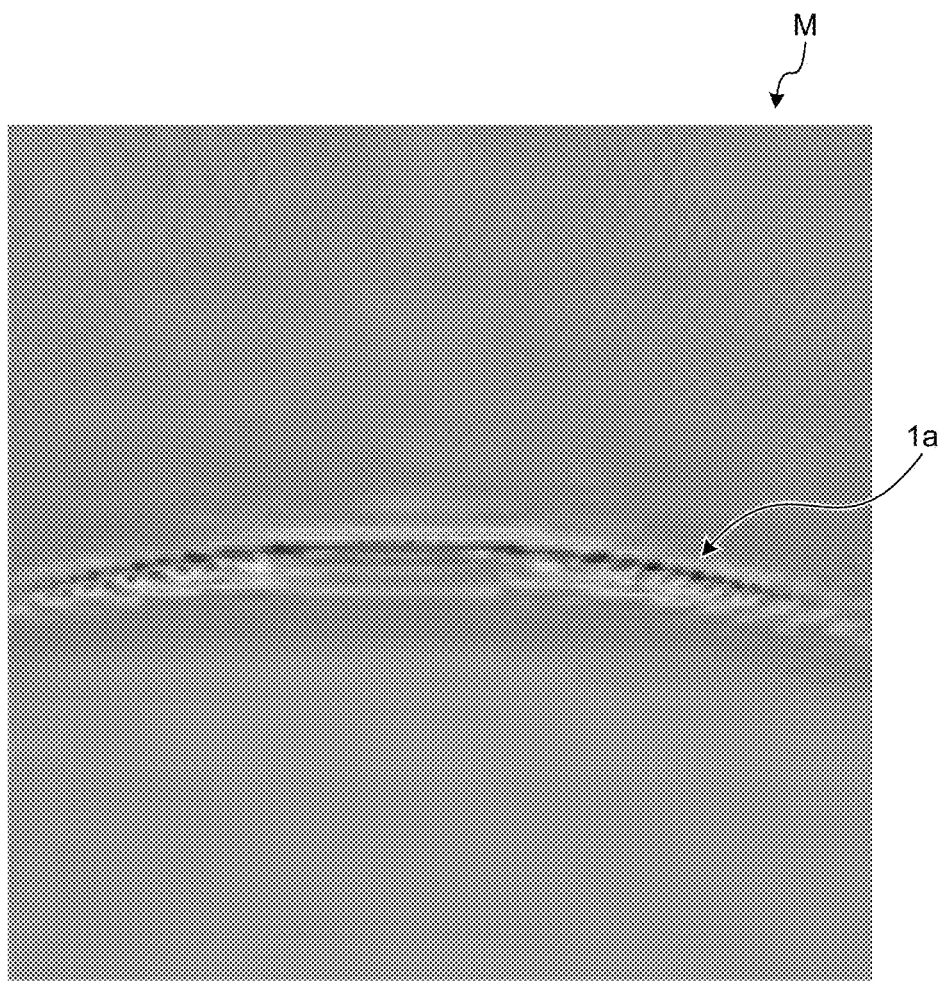
FIG. 4 is an explanatory diagram illustrating an example of an image including a surface of piping created at a primary depicting step.

At Step S2, the second arithmetic processing unit 24 performs a primary depicting step (primary depicting processing). The primary depicting step is a step of depicting an image M including the surface 1a of the piping 1 in the region partitioned into the pixels P based on the data of the ultrasonic signals S collected at the data collection step. FIG. 4 is an explanatory diagram illustrating an example of the image including the surface of the piping created at the primary depicting step. The image M exemplified in FIG. 4 corresponds to a range enclosed by a dashed line in FIG. 2. The image M exemplified in FIG. 4 can be depicted by synthesizing the amplitude values of the ultrasonic signals S collected by the FMC at the data collection step such that the timing at which the amplitude value is increased and the position of the pixel P are matched with each other, and calculating an intensity value related to the synthesized amplitude value to be mapped into the calculation region. This processing can be performed by using the known TFM. The primary depicting step can also be performed using a method other than the TFM. For the primary depicting step, for example, a method of synthesizing received echoes in a frequency region using an inverse scattering imaging method (ISIM) can be used. Furthermore, at the primary depicting step, the surface shape can be depicted by a phased array method or a vertical UT method, not limited to a waveform resynthesis processing by the TFM. As exemplified in FIG. 2 as a range between two-dot chain lines, the second arithmetic processing unit 24 creates the image M while placing the surface position of the piping 1 in a predetermined range H defined in advance. The predetermined range H is, for example, defined based on a time at which the ultrasonic signal S propagates by a distance between the linear array probe 11 and the surface position of the piping 1 via a medium A filled in the space between the probe 110 and the piping 1. Due to this, the image M including the surface 1a of the piping 1 can be created by performing synthesis processing on only the ultrasonic signal S that has propagated through the medium A and been reflected from the surface position of the piping 1 among the ultrasonic signals S collected by the FMC.

At Step S3, the second arithmetic processing unit 24 performs a shape identifying step (shape identifying processing). At the shape identifying step, in the image M depicted at the primary depicting step, the pixel P having the maximum pixel intensity is extracted from the pixels P arranged along the direction e2 perpendicular to the extending direction of the surface 1a of the piping 1, and the position of the extracted pixel P is identified as the surface shape of the piping 1. The pixels P arranged along the direction e2 mean the pixels P included in a line along the direction e2. The pixels P arranged along the direction e2 may be constituted of a plurality of pixels P arranged in two or more lines along the direction e2, not limited to the pixels P arranged in a line along the direction e2.

Figure 5:
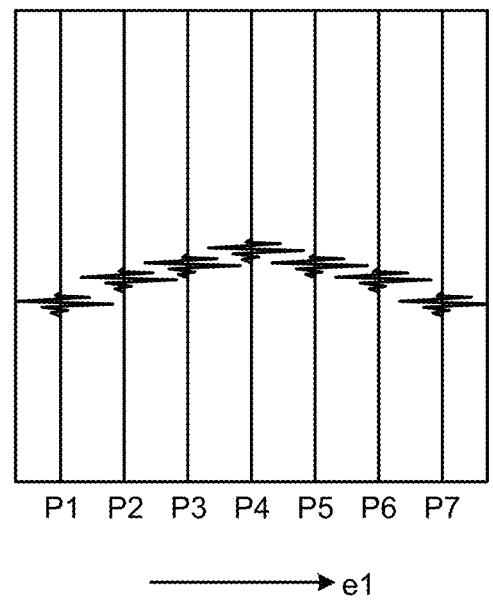
FIG. 5 is an explanatory diagram illustrating an example of plotting pixel intensity.
Figure 6:
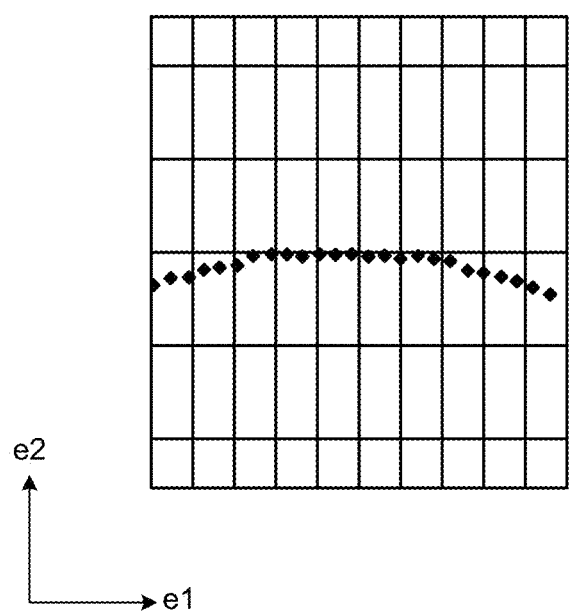
FIG. 6 is an explanatory diagram illustrating coordinates of each pixel having the maximum pixel intensity.

The following describes the shape identifying step in detail with reference to FIG. 5 and FIG. 6. FIG. 5 is an explanatory diagram illustrating an example of plotting the pixel intensity, and FIG. 6 is an explanatory diagram illustrating coordinates of each pixel having the maximum pixel intensity. In FIG. 5, lines P1, P2, P3, P4, P5, P6, and P7 of the pixels P along the direction e2 are arranged along the direction e1, and the pixel intensity of the pixels P included in the lines P1 to P7 is plotted. As illustrated in the drawing, when plotting points of the pixel intensity of the respective pixels P are connected for each of the lines P1 to P7, the pixel intensity can be represented like a waveform. Based on the amplitude value of the waveform, the pixel P having the maximum pixel intensity can be extracted for each of the lines P1 to P7. For all the pixels P included in the image M illustrated in FIG. 4, the second arithmetic processing unit 24 extracts the pixel P having the maximum pixel intensity from each line of the pixels P. As a result, as illustrated in FIG. 6, the extracted pixels P become point cloud data arranged along the direction e1. The second arithmetic processing unit 24 identifies the point cloud data illustrated in FIG. 6 as the surface shape of the piping 1 (sets the point cloud data as surface coordinates of the piping 1).

At the time of extracting the pixel P having the maximum pixel intensity through the procedure described above at the shape identifying step, the second arithmetic processing unit 24 extracts only the pixel P having pixel intensity equal to or larger than a predetermined threshold. The predetermined threshold is previously determined as a value with which the ultrasonic signal S reflected from the surface 1a of the piping 1 can be estimated as mainly reflected toward the outside of a range of the probes 110 of the linear array probe 11. In a case in which the ultrasonic signal S is mainly reflected toward the outside of the range of the probes 110 of the linear array probe 11, it can be estimated that the ultrasonic signal S does not enter the inner part of the piping 1. Thus, the position of the pixel P having pixel intensity smaller than the predetermined threshold is not required to be treated as the surface shape (surface coordinates) of the piping 1 in subsequent processing, and this pixel P can be excluded.

After identifying the surface shape of the piping 1 through the processing at Step S1 to Step S3, the second arithmetic processing unit 24 performs a path calculation step (path calculation processing) at Step S4. The path calculation step is a step of calculating a position at which the propagation time of the ultrasonic signal S from the probe 110 to a certain pixel P is minimized on the surface shape identified at the shape identifying step, and causing a path passing through the calculated position on the surface shape to be a propagation path of the ultrasonic signal S.

Figure 7:
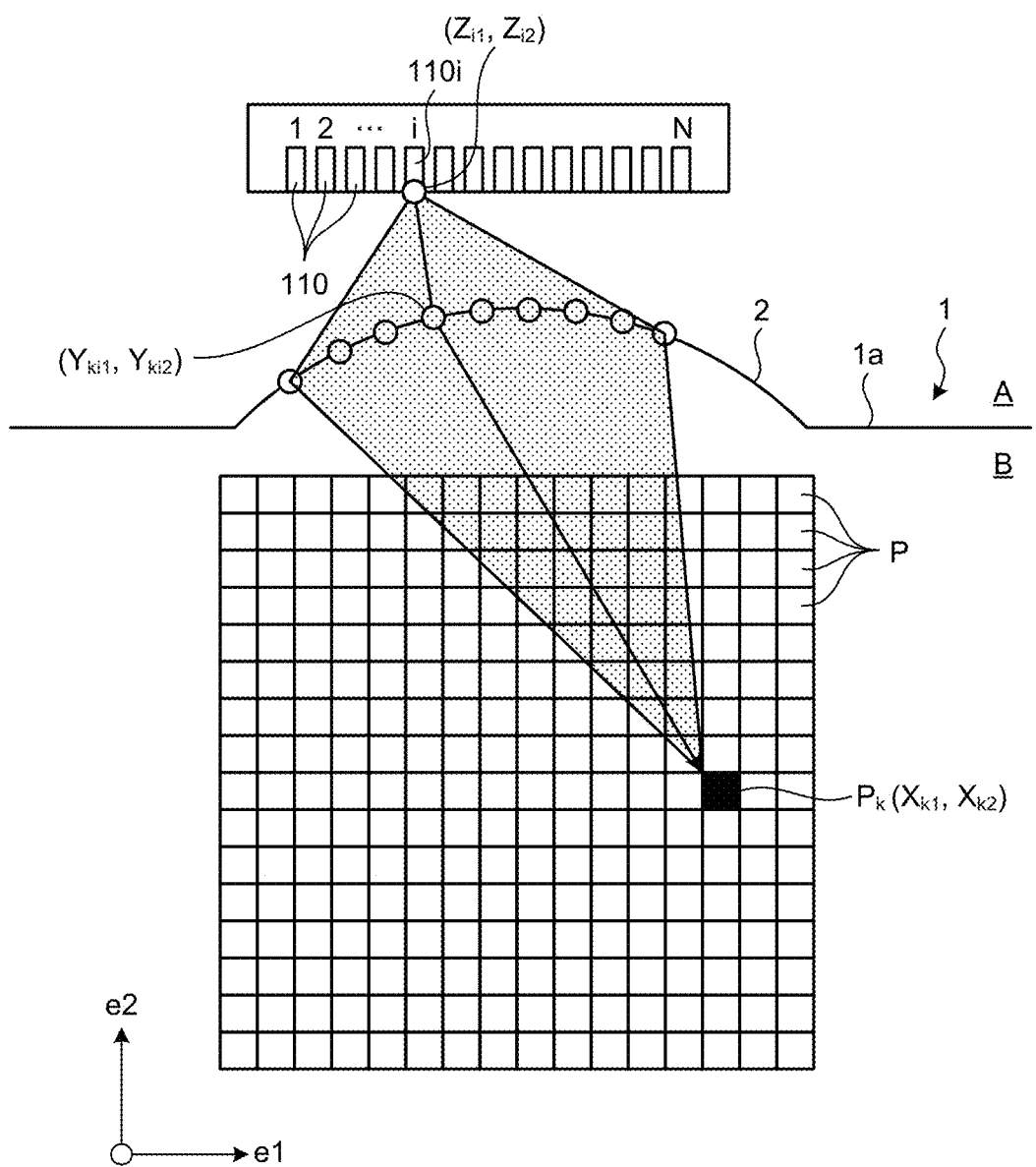
FIG. 7 is an explanatory diagram illustrating an example of a propagation path of an ultrasonic signal from a certain probe to a certain pixel.
Figure 8:
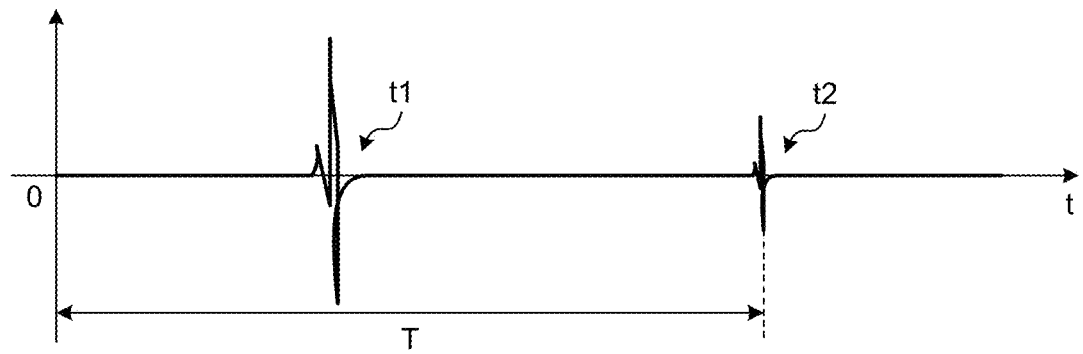
FIG. 8 is an explanatory diagram illustrating an example of a waveform of an ultrasonic signal in a period in which the ultrasonic signal reaches the certain pixel from the certain probe.

The following describes details about the path calculation step with reference to FIG. 7 and FIG. 8. FIG. 7 is an explanatory diagram illustrating an example of the propagation path of the ultrasonic signal from a certain probe to a certain pixel, and FIG. 8 is an explanatory diagram illustrating an example of a waveform of the ultrasonic signal in a period in which the ultrasonic signal reaches the certain pixel from the certain probe. In FIG. 7, assuming that coordinate axes are the directions e1 and e2, coordinates of a certain (the i-th) probe 110i are assumed to be $(Z_{i1}, Z_{i2})$, coordinates of a certain pixel $P_k$ are assumed to be $(X_{k1}, X_{k2})$, and the surface coordinates of the piping 1 through which the ultrasonic signal S passes are assumed to be $(Y_{ki1}, Y_{ki2})$. In this case, the inner part of the piping 1 is treated as "medium B". FIG. 8 illustrates a waveform of the ultrasonic signal S in a case in which there is a defect in the inner part of the welding part 2 at the position of the certain pixel $P_k$.

As illustrated in FIG. 7 and FIG. 8, the ultrasonic signal S transmitted from the probe 110$i$ is refracted at the surface 1$a$ of the piping 1 as a boundary between the medium A and the medium B (at time t1 in FIG. 8), enters the inner part (medium B) of the welding part 2, and reaches the position of the pixel $P_k$ (at time t2 in FIG. 8). In this case, propagation time T of the ultrasonic signal S reached from the probe 110$i$ to the position of the pixel $P_k$ can be calculated by the following Equation (1). In Equation (1), "Ca" represents sonic speed in the medium A, and "Cb" represents sonic speed in the medium B (piping 1).

$$T = \text{Sqrt}((Z_{i1}-Y_{ki1})^2+(Z_{i2}-Y_{ki2})^2)/Ca + \text{Sqrt}((Y_{ki1}-X_{k1})^2 + (Y_{ki2}-X_{k2})^2)/Cb \quad (1)$$

In this case, the coordinates of the certain probe 110$i$ ($Z_{i1}, Z_{i2}$) and coordinates of the certain pixel $P_k$ ($X_{k1}, X_{k2}$) are values determined in advance, so that unknown values in Equation (1) are only the surface coordinates of the piping 1 ($Y_{ki1}, Y_{ki2}$). It can be considered that the ultrasonic signal S passes through the shortest propagation path from the probe 110$i$ to the position of the pixel $P_k$. This is based on Fermat's principle. Thus, among the surface coordinates of the piping 1 identified at the shape identifying step, coordinates at which the propagation time T calculated by Equation (1) is minimized can be a position at which the ultrasonic signal S enters the inner part (medium B) of the piping 1 from the medium A. Accordingly, all of the coordinates of the certain probe 110$i$ ($Z_{i1}, Z_{i2}$), the coordinates of the certain pixel $P_k$ ($X_{k1}, X_{k2}$), and the surface coordinates of the piping 1 ($Y_{ki1}, Y_{ki2}$) are determined, so that the transmission path of the ultrasonic signal S can be determined. In accordance with the determination procedure of the propagation path described above, the second arithmetic processing unit 24 calculates all propagation paths through which the ultrasonic signals S transmitted from the respective probes 110 reach the pixels P included in the calculation region.

At Step S5, the second arithmetic processing unit 24 performs an amplitude value synthesis step (amplitude value synthesis processing). The amplitude value synthesis step is a step of synthesizing the amplitude values such that the pixel and the timing at which the amplitude value is increased are matched with each other based on the propagation path calculated at the path calculation step for the data of the ultrasonic signals S collected at the data collection step. That is, when the propagation path of the ultrasonic signal S to each pixel P is determined at the path calculation step, the propagation time T of the ultrasonic signal S to each pixel P is also determined based on Equation (1). Thus, by checking the timing at which the amplitude value is increased (time t2 in the example illustrated in FIG. 8) against the propagation time T calculated by Equation (1) for the data of each of the ultrasonic signals S collected by the FMC at the data collection step, it is possible to determine at which pixel P the ultrasonic signal S is reflected. Thus, for the data of all the ultrasonic signals S collected by the FMC at the data collection step, the second arithmetic processing unit 24 synthesizes the amplitude values of the ultrasonic signals S the propagation time T of which is identical for a corresponding pixel P.

At Step S6, the second arithmetic processing unit 24 performs a depicting step. The depicting step is a step of calculating a calculation result of depicting the inner part of the piping 1 by calculating the intensity value related to the amplitude value synthesized at the amplitude value synthesis step and mapping the intensity value into the calculation region. The second arithmetic processing unit 24 transmits the calculation result of depicting the inner part of the piping 1 to the calculation result display unit 31 of the operation/display unit 30 via the first arithmetic processing unit 23. Due to this, the user can refer to the calculation result reflected in the calculation result display unit 31.

As described above, with the ultrasonic inspection method, the ultrasonic inspection device 100, and the computer program according to the first embodiment, the surface shape of the piping 1 can be identified only by creating the image M not including the entire piping 1 as the inspection object but including the surface 1$a$, and extracting the pixel P having the maximum pixel intensity from the created image M. Thus, complicated processing is not required to identify the surface shape of the piping 1. Accordingly, with the ultrasonic inspection method, the ultrasonic inspection device 100, and the computer program according to the first embodiment, a calculation load in the processing can be reduced in the inspection method of making ultrasonic inspection of the inspection object by the FMC/TFM.

At the primary depicting step (primary depicting processing, Step S2), the image M is depicted in the predetermined range H that defines the range including the surface 1$a$ of the piping 1 in advance.

With this configuration, the image M including the surface 1$a$ can be created while excluding the ultrasonic signal S reflected at a position different from the surface 1$a$ of the piping 1 (that is, the inner part of the piping 1), so that calculation accuracy can be improved.

At the shape identifying step (shape identifying processing, Step S3), the pixel P having the pixel intensity equal to or larger than the predetermined threshold is extracted from the pixels P having the maximum pixel intensity.

With this configuration, the surface 1$a$ of the inspection object having the pixel intensity smaller than the predetermined threshold is estimated as a position at which the ultrasonic signal S is reflected to the outside of the range of the probes 110 and does not enter the inner part of the piping 1, and the surface position can be excluded from being used for identifying the surface shape. As a result, in the processing after the identified surface shape is used, the processing can be performed without using unnecessary position data of the surface shape, so that the calculation load can be further reduced.

The data synthesis step (Step S2 to Step S5) further includes the path calculation step (path calculation processing, Step S4) of calculating the position at which the propagation time T of the ultrasonic signal S from the probe 110 to the certain pixel P is minimized on the surface shape identified at the shape identifying step and causing the path passing through the calculated position on the surface shape to be the propagation path of the ultrasonic signal S, and the amplitude value synthesis step (amplitude value synthesis processing, Step S5) of synthesizing the amplitude values such that the pixel and the timing at which the amplitude value is increased are matched with each other based on the propagation path calculated at the path calculation step for the data of the ultrasonic signals collected at the data collection step.

With this configuration, a result of a reflected waveform of the ultrasonic signals S can be obtained by synthesizing the amplitude values such that the position and the timing at which the ultrasonic signal S transmitted from each of the probes 110 is reflected in the inner part of the piping 1 (at which the amplitude value is increased) are matched with each other. Due to this, a position of an internal defect of the piping 1 can be detected. By using a data group of the ultrasonic signals S acquired at the data collection step, the processing can be successively performed after the surface shape of the piping 1 is identified, so that real-time performance of inspection can be improved.

The second arithmetic processing unit 24 includes a plurality of cores assigned to each unit voxel including at least one pixel P, and performs the shape identifying processing for each unit voxel in parallel by using the cores. The second arithmetic processing unit 24 also performs the path calculation processing and the amplitude value synthesis processing for each unit voxel in parallel by using the cores.

With this configuration, the calculation speed can be improved. The shape identifying processing, the path calculation processing, and the amplitude value synthesis processing may be performed with a single core.

In the first embodiment, a single medium is filled in the space between the probe 110 and the piping 1, but the component of the medium is not limited thereto. Any medium that can propagate the ultrasonic signal S may be used. The medium may be air.

The medium is not limited to a single medium, and may include a plurality of media. In a case of using a plurality of media, respective pieces of processing at the data synthesis step (Step S2 to Step S5) may be performed corresponding to a type and an arrangement position of each medium.

The ultrasonic signal S may be propagated through water as a medium by sinking the entire inspection object or a limited part of the inspection object into water to fill the space between the linear array probe 11 and the inspection object with water.

In the first embodiment, a defect of the inner part of the piping 1 is assumed to be detected, but an application target of the ultrasonic inspection method and the ultrasonic inspection device 100 according to the first embodiment is not limited thereto. For example, the ultrasonic inspection method and the ultrasonic inspection device 100 according to the first embodiment may be applied to a case of measuring the wall thickness of the piping 1. That is, when the shape of the surface (outer surface) 1a of the piping 1 is identified at the shape identifying step, and similar synthesis processing is performed on the ultrasonic signal reflected from the inner surface of the piping 1 in subsequent processing, an image depicting a range from the surface (outer surface) 1a to the inner surface of the piping 1 can be created. Due to this, flaw inspection of the welding part 2 of the piping 1 and measurement of the wall thickness of the piping 1 may be performed based on data collected at one time of data collection step. As a result, the time required for inspection can be shortened, and a stop time for inspecting plant facilities in which the piping 1 is disposed can be shortened.

The inspection object is not limited to the piping 1, and may be any object on which the flaw detector 10 can be placed, which can be scanned with ultrasonic signals.

Second Embodiment

Next, the following describes the ultrasonic inspection device and the ultrasonic inspection method according to a second embodiment. As described above, when plotting points of the pixel intensity of the respective pixels P are connected for each of the lines P1 to P7 of the pixels P along the direction e2 in the image M depicted at the primary depicting step, the pixel intensity can be represented as continuous values like a waveform (for example, refer to FIG. 5). A wave height of the continuous values of the pixel intensity tends to be lower in the vicinity of an end part, that is, a starting point 2S (refer to FIG. 9) and an ending point 2E (refer to FIG. 9) than that in a center point 2C (refer to FIG. 9) on a concavo-convex surface 2A (refer to FIG. 9) formed by the welding part 2 of the piping 1. This is because an amount of the ultrasonic signals S captured by the respective probes 110 is reduced as compared with that in the vicinity of the center point 2C at the data collection step at Step S1 in FIG. 3, the ultrasonic signals S emitted from the respective probes 110 and reflected by the end part of the concavo-convex surface 2A. As a result, a large number of noise components may be detected in the vicinity of the end part of the concavo-convex surface 2A, and the surface shape in the vicinity of the end part of the concavo-convex surface 2A cannot be identified with high accuracy in some cases.

Figure 9:
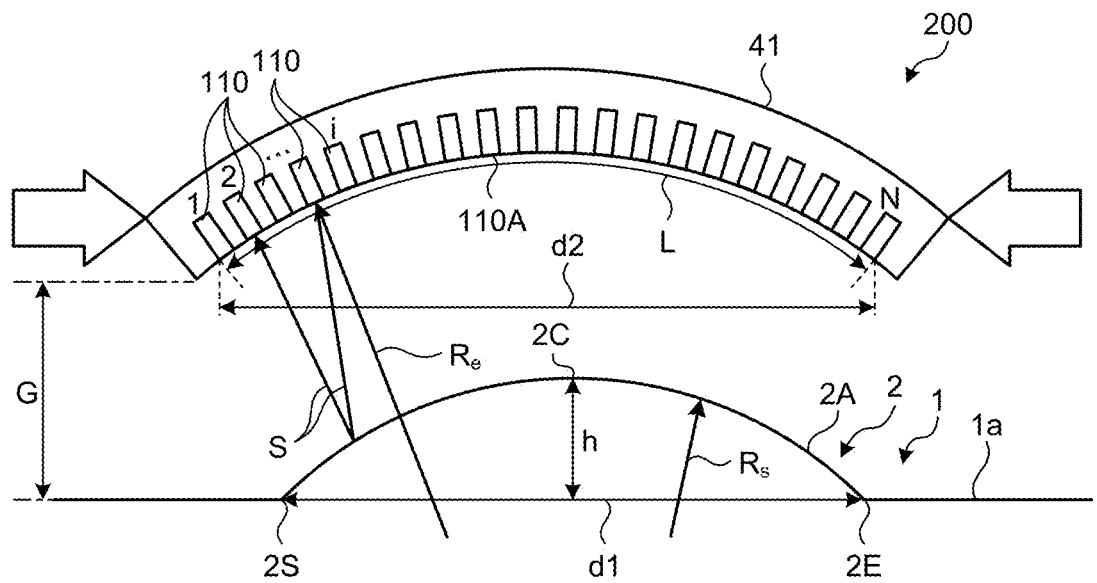
FIG. 9 is a schematic explanatory diagram of an ultrasonic inspection device according to a second embodiment.

In the second embodiment, the surface shape including the end part of the concavo-convex surface 2A is identified with high accuracy with a device configuration and processing described below. FIG. 9 is a schematic explanatory diagram of the ultrasonic inspection device according to the second embodiment. An ultrasonic inspection device 200 according to the second embodiment includes a linear array probe 41 in place of the linear array probe 11 of the ultrasonic inspection device 100. The other components of the ultrasonic inspection device 200 are the same as those of the ultrasonic inspection device 100, so that the same component will be denoted by the same reference numeral, and redundant description will not be repeated.

Similarly to the linear array probe 11, the linear array probe 41 includes a plurality of (N) probes 110 connected to the pulser 12 and the receiver 13. A transmission and reception surface 110A formed of the probes 110 that transmits/receives ultrasonic signal S forms part of a lower end face of the linear array probe 41. As illustrated in FIG. 9, the linear array probe 41 is a flexible array probe that can be freely curved in the arrangement direction of the probes 110 (in a right and left direction in FIG. 9). In other words, the transmission and reception surface 110A formed of the probes 110 can be freely curved in the arrangement direction. In the example illustrated in FIG. 9, the linear array probe 41 is formed in a size of covering the concavo-convex surface 2A formed by the welding part 2 of the piping 1 in a curved state. As represented by a void arrow in FIG. 9, the transmission and reception surface 110A formed of the probes 110 of the linear array probe 41 is curved when a predetermined pressing force along the arrangement direction is applied thereto.

Figure 10:
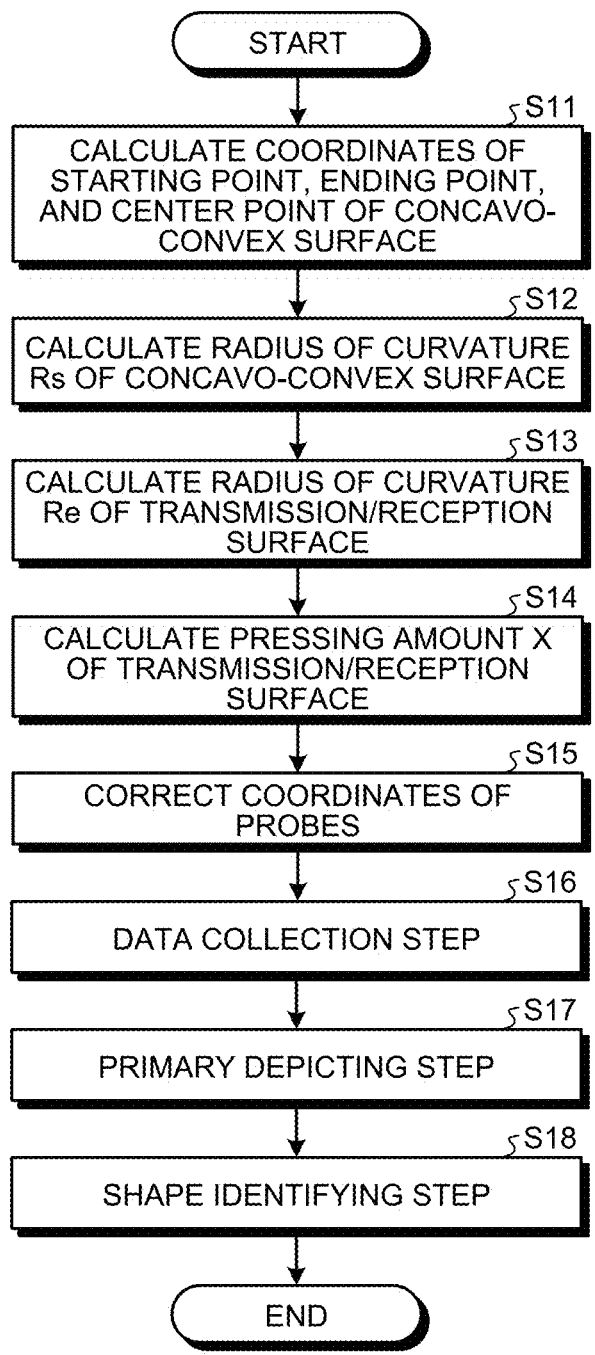
FIG. 10 is a flowchart illustrating an example of a principal part of a processing procedure of an ultrasonic inspection method according to the second embodiment.

Next, the following describes a principal part of the ultrasonic inspection method according to the second embodiment with reference to FIG. 9 and FIG. 10. FIG. 10 is a flowchart illustrating an example of a principal part of the processing procedure of the ultrasonic inspection method according to the second embodiment. More specifically, FIG. 10 illustrates an example of the processing procedure for correcting coordinates of each of the probes 110 when the linear array probe 41 is curved. The processing procedure illustrated in FIG. 10 is performed between the shape identifying step and the path calculation step illustrated in FIG. 3.

The second arithmetic processing unit 24 of the calculation unit 20 identifies the surface shape of the piping 1 by performing the data collection step at Step S1 to the shape identifying step at Step S3 illustrated in FIG. 3, and then identifies coordinate points of the starting point 2S, the ending point 2E, and the center point 2C of the concavo-convex surface 2A based on the identified surface shape at Step S11. The starting point 2S, the ending point 2E, and the center point 2C of the concavo-convex surface 2A are identified based on the coordinates of each pixel P of the identified surface shape.

Next, the second arithmetic processing unit 24 calculates a radius of curvature Rs of the concavo-convex surface 2A at Step S12. The radius of curvature Rs of the concavo-convex surface 2A is calculated by the Newton's method using the following Equations (2) and (3). In Equation (2), "d1" represents a chord length of the concavo-convex surface 2A, that is, a distance in a straight line from the starting point 2S to the ending point 2E. In Equation (3), "h" represents a camber of the concavo-convex surface 2A at the center point 2C, which is calculated based on a difference from the coordinates in the vertical direction of the surface 1a other than the concavo-convex surface 2A. In Equations (2) and (3), "θ" represents a central angle of the concavo-convex surface 2A. When values of "d1" and "h" are determined, the radius of curvature Rs and "θ" are also calculated as approximate values by the Newton's method.

$$d1 = 2 \cdot Rs \cdot \sin(\theta/2) \quad (2)$$

$$h = Rs \cdot (1 - \cos(\theta/2)) \quad (3)$$

Next, at Step S13, the second arithmetic processing unit 24 calculates a radius of curvature Re of the transmission and reception surface 110A formed of the probes 110. In this case, the radius of curvature Re is a value as a command value for causing the transmission and reception surface 110A formed of the probes 110 to be curved corresponding to the concavo-convex surface 2A. The radius of curvature Re as the command value is calculated by the following Equation (4). As illustrated in FIG. 9, in Equation (4), "G" represents a distance (gap) from the surface 1a other than the concavo-convex surface 2A of the piping 1 to a lower end of the transmission and reception surface 110A.

$$Re = Rs + G \quad (4)$$

Next, at Step S14, the second arithmetic processing unit 24 calculates a value of a pressing amount X of the transmission and reception surface 110A. The pressing amount X is an amount of pressing the linear array probe 41 along the arrangement direction to cause the transmission and reception surface 110A formed of the probes 110 to be curved with the radius of curvature Re described above, which is calculated by the following Equation (5). In Equation (5), "L" represents an arc length, that is, an initial length of the transmission and reception surface 110A, and "d2" represents a chord length of the transmission and reception surface 110A, that is, a distance in a straight line between the probes 110 at the end parts. "d2" can be calculated by Equation (6).

$$X = L - d2 \quad (5)$$

$$d2 = 2 \cdot Re \cdot \sin(L/Re) \quad (6)$$

When the pressing amount X is determined in this way, pressing force is applied to the linear array probe 41 so that the linear array probe 41 is curved by the pressing amount X. Due to this, as illustrated in FIG. 9, the linear array probe 41 is curved, and the transmission and reception surface 110A formed of the probes 110 is curved with the radius of curvature Re to have a shape along the concavo-convex surface 2A. The pressing force may be applied to the linear array probe 41 by a drive device (not illustrated) that is controlled by the control unit 21.

Next, at Step S15, the second arithmetic processing unit 24 corrects the coordinates of the probes 110. That is, the second arithmetic processing unit 24 calculates the coordinates of each probe 110 in a state in which the transmission and reception surface 110A formed of the probes 110 is curved with the radius of curvature Re based on the value of the pressing amount X, and sets the calculated coordinates to be the coordinates of each probe 110.

At Step S16 to Step S18, the second arithmetic processing unit 24 performs the data collection step at Step S1, the primary depicting step at Step S2, and the shape identifying step at Step S3 illustrated in FIG. 3 again. Due to this, as illustrated in FIG. 9, the ultrasonic signals S reflected in the vicinity of the end part of the concavo-convex surface 2A can be more favorably captured by the probes 110 of the transmission and reception surface 110A curved with the radius of curvature Re along the concavo-convex surface 2A. That is, at the data collection step at Step S16 to be performed again, a larger number of ultrasonic signals S reflected in the vicinity of the end part of the concavo-convex surface 2A can be captured. As a result, at the primary depicting step at Step S17 and the shape identifying step at Step S18 to be performed again, the surface shape of the piping 1 including the vicinity of the end part of the concavo-convex surface 2A can be identified with higher accuracy.

In the second embodiment, the processing illustrated in FIG. 10 is performed after the data collection step at Step S1 to the shape identifying step at Step S3 in FIG. 3 are performed once. Alternatively, the coordinates of the surface shape of the piping 1 may be identified through well-known TFM processing based on the data of the ultrasonic signals S collected at the data collection step at Step S1, and the processing in FIG. 10 may be performed by using the identified coordinates of the surface shape.

Third Embodiment

Next, the following describes the ultrasonic inspection device and the ultrasonic inspection method according to a third embodiment. In the ultrasonic inspection method according to the third embodiment, processing described below is performed at the shape identifying step illustrated in FIG. 3. In the third embodiment, the device configuration is the same as that of the ultrasonic inspection device 100 illustrated in FIG. 1 except that processing content of the calculation unit 20 is different, so that the description about the device configuration will not be repeated.

In the third embodiment, at the shape identifying step at Step S3, the second arithmetic processing unit 24 of the calculation unit 20 extracts the pixel P having the maximum pixel intensity using a differential filter. That is, as described above, when plotting points of the pixel intensity of the respective pixels P are connected for each of the lines P1 to P7 of the pixels P along the direction e2 (the direction perpendicular to the extending direction of the surface 1a) in the image M depicted at the primary depicting step, the pixel intensity can be represented as continuous values like a waveform (refer to FIG. 5). In the third embodiment, the pixel P having the maximum pixel intensity is extracted based on a value obtained by applying the differential filter to the continuous value. That is, by applying the differential filter, a change amount of the continuous values of the waveform exemplified in FIG. 5 can be obtained, and it is possible to identify that the pixel P has higher pixel intensity as the change amount thereof is larger. Thus, a predetermined differential filter is applied to the continuous values of the waveform exemplified in FIG. 5, and the pixel P the change amount of which is the largest is identified to be the pixel P having the maximum pixel intensity.

In the third embodiment, the pixel P having the maximum pixel intensity is identified by using a different differential filter for each position on the concavo-convex surface 2A (refer to FIG. 9). As described above, a wave height of the continuous values of the pixel intensity tends to be lower in the vicinity of the starting point 2S and the ending point 2E as the end parts than that in the center point 2C of the concavo-convex surface 2A. Thus, it is preferable to use a differential filter having higher sensitivity in the vicinity of the starting point 2S and the ending point 2E as the end parts. In the third embodiment, a primary differential filter represented by Equations (7) and (8) is used in the vicinity of the center point 2C of the concavo-convex surface 2A. Equation (7) represents a Prewitt filter, and Equation (8) represents a Sobel filter. In the vicinity of the center point 2C, any of the Prewitt filter and the Sobel filter may be used. On the other hand, in the vicinity of the starting point 2S and the ending point 2E as the end parts of the concavo-convex surface 2A, a secondary differential filter represented by Equation (9) is used. The secondary differential filter of Equation (9) is a Laplacian filter.

$$\begin{pmatrix} 1 \\ 1 \\ 1 \end{pmatrix} (-1 \ 0 \ 1) = \begin{pmatrix} -1 & 0 & 1 \\ -1 & 0 & 1 \\ -1 & 0 & 1 \end{pmatrix} \quad (7)$$

$$\begin{pmatrix} 1 \\ 1 \\ 1 \end{pmatrix} (-1 \ 0 \ 1) = \begin{pmatrix} -1 & 0 & 1 \\ -2 & 0 & 2 \\ -1 & 0 & 1 \end{pmatrix} \quad (8)$$

$$\begin{pmatrix} 0 & 0 & 0 \\ 1 & -1 & 0 \\ 0 & 0 & 0 \end{pmatrix} - \begin{pmatrix} 0 & 0 & 0 \\ 0 & 1 & -1 \\ 0 & 0 & 0 \end{pmatrix} = \begin{pmatrix} 0 & 0 & 0 \\ 1 & -2 & 1 \\ 0 & 0 & 0 \end{pmatrix} \quad (9)$$

In this way, even when the wave height of the continuous values of the pixel intensity is low, the pixel P having the maximum pixel intensity can be extracted with high accuracy by using the secondary differential filter having higher sensitivity for the change amount in the starting point 2S and the ending point 2E as the end parts of the concavo-convex surface 2A than that in the center point 2C. Accordingly, at the shape identifying step at Step S3 illustrated in FIG. 3, the surface shape of the piping 1 including the end parts (edge portions) of the concavo-convex surface 2A can be identified with higher accuracy.

Fourth Embodiment

Figure 11:
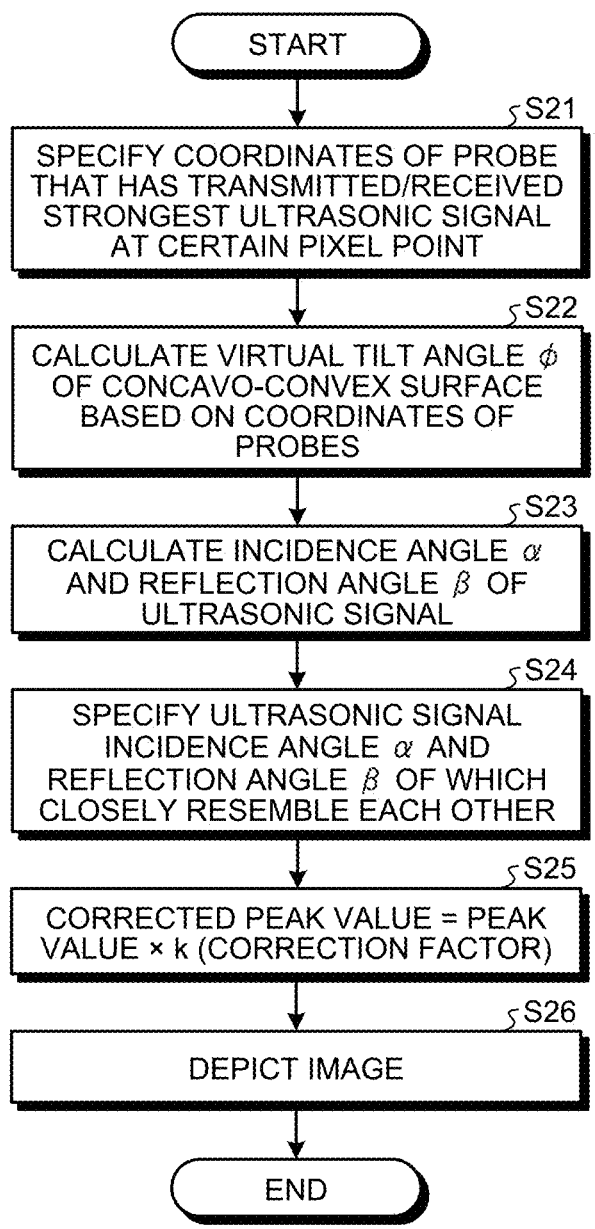
FIG. 11 is a flowchart illustrating an example of a principal part of a processing procedure of an ultrasonic inspection method according to a fourth embodiment.

Next, the following describes the ultrasonic inspection device and the ultrasonic inspection method according to a fourth embodiment. In the ultrasonic inspection method according to the fourth embodiment, processing described below is performed at the primary depicting step illustrated in FIG. 3. In the fourth embodiment, the device configuration is the same as that of the ultrasonic inspection device 100 illustrated in FIG. 1 except that processing content of the calculation unit 20 at the primary depicting step is different, so that the description about the device configuration will not be repeated. FIG. 11 is a flowchart illustrating an example of a principal part of a processing procedure of the ultrasonic inspection method according to the fourth embodiment.

Figure 12:
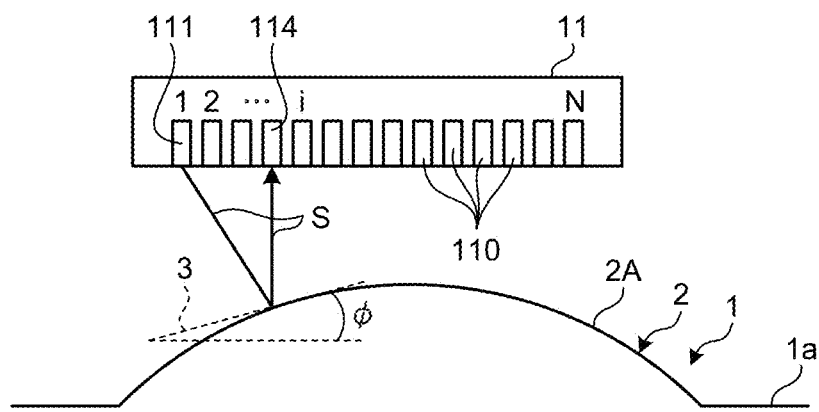
FIG. 12 is an explanatory diagram illustrating an example of a probe that has transmitted and received an ultrasonic signal having the highest strength.

At Step S21, the second arithmetic processing unit 24 of the calculation unit 20 identifies the coordinates of the probe 110 that has received the ultrasonic signal S having the highest strength and the probe 110 that has transmitted the ultrasonic signal S having the highest strength from the data of the ultrasonic signals S collected at the data collection step in FIG. 3. FIG. 12 is an explanatory diagram illustrating an example of the probe that has transmitted and received the ultrasonic signal having the highest strength. As illustrated in FIG. 12, it is assumed that the ultrasonic signal S having the highest strength reflected by a certain pixel on the concavo-convex surface 2A of the piping 1 is transmitted by a probe 111, and received by a probe 114. In this case, the second arithmetic processing unit 24 identifies the coordinates of the probe 111 and the probe 114. As the strongest ultrasonic signal S reflected by the certain pixel on the concavo-convex surface 2A, it is possible to extract and identify an ultrasonic signal the amplitude value of which is increased because of being reflected by the concavo-convex surface 2A as represented at time t1 in FIG. 8, for example, from among the pieces of data of the ultrasonic signals S collected at the data collection step. Similarly, for all the pixels on the concavo-convex surface 2A, the coordinates of the probe 110 that has received the ultrasonic signal S having the highest strength and the probe 110 that has transmitted the ultrasonic signal S having the highest strength are identified.

Next, at Step S22, the second arithmetic processing unit 24 calculates (estimates) a virtual tilt angle ϕ of the concavo-convex surface 2A for each certain pixel based on the coordinates of the probes 110 specified at Step S21. The virtual tilt angle ϕ is a tilt angle with respect to the extending direction, which is calculated based on the coordinates of the probe 110 that has transmitted and received the strongest ultrasonic signal S and time required for transmitting/receiving the strongest ultrasonic signal S. The second arithmetic processing unit 24 calculates virtual tilt angles ϕ for all the pixels on the concavo-convex surface 2A using the same method. In other words, the shape of the concavo-convex surface 2A is identified with the virtual tilt angle ϕ.

Figure 13:
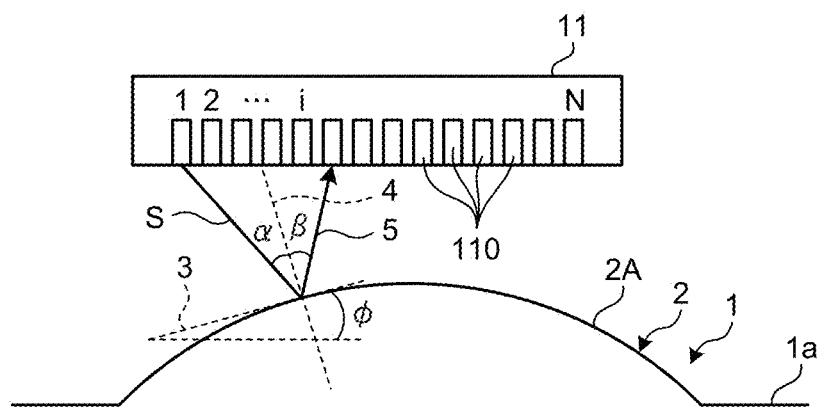
FIG. 13 is an explanatory diagram illustrating an example of an incidence angle and a reflection angle of the ultrasonic signal.

Next, at Step S23, the second arithmetic processing unit 24 calculates an incidence angle α and a reflection angle β of the ultrasonic signal S that is emitted from each of the probes 110, reflected by the concavo-convex surface 2A, and received by the other probe 110. FIG. 13 is an explanatory diagram illustrating an example of the incidence angle and the reflection angle of the ultrasonic signal. Based on the virtual tilt angle ϕ of the concavo-convex surface 2A calculated at Step S22, a virtual tilted surface 3 that is tilted at the virtual tilt angle ϕ with respect to the extending direction is defined. As illustrated in FIG. 13, angles formed by the ultrasonic signal S with respect to an orthogonal surface 4 perpendicular to the virtual tilted surface 3 are the incidence angle α and the reflection angle β. The second arithmetic processing unit 24 calculates the incidence angle α and the reflection angle β for the ultrasonic signals S reflected by all the pixels on the concavo-convex surface 2A.

Next, at Step S24, the second arithmetic processing unit 24 identifies the ultrasonic signal S the incidence angle α and the reflection angle β of which calculated at Step S23 closely resemble each other for the data of all the ultrasonic signals S. The ultrasonic signal S the incidence angle α and the reflection angle β of which closely resemble each other mean the ultrasonic signal S the incidence angle α and the reflection angle β are the closest to each other among the ultrasonic signals S reflected by the respective pixels on the concavo-convex surface 2A. A condition may be such that a difference between the incidence angle α and the reflection angle β is equal to or smaller than a predetermined value. In this way, the ultrasonic signal S the incidence angle α and the reflection angle β of which closely resemble each other typically tends to be the strongest ultrasonic signal S reflected by the concavo-convex surface 2A. At Step S24, not only the ultrasonic signal S the incidence angle α and the reflection angle β of which have values closest to each other but also the ultrasonic signals S the incidence angle α and the reflection angle β of which have the second closest values, the third closest values, and subsequent values may be identified.

At Step S25, the second arithmetic processing unit 24 performs emphasis correction on the ultrasonic signal S the incidence angle α and the reflection angle β of which closely resemble each other identified at Step S24. That is, for the identified ultrasonic signal S the incidence angle α and the reflection angle β of which closely resemble each other, a corrected peak value is calculated, the correction peak value obtained by multiplying a peak value (amplitude value) by a predetermined correction factor k.

At Step S26, the second arithmetic processing unit 24 depicts the image M (refer to FIG. 4) using all pieces of data including the ultrasonic signal S on which emphasis correction is performed at Step S25, that is, the ultrasonic signal S the peak value of which is caused to be the corrected peak value. That is, amplitude values of all the pieces of data including the ultrasonic signal S subjected to emphasis correction are synthesized such that a timing at which the amplitude value increases and a position of the pixel are matched with each other, and calculates a strength value related to the synthesized amplitude value to be mapped in a calculation region.

The processing at Step S25 may be processing of excluding, from a data group, the ultrasonic signals S other than the ultrasonic signal S the incidence angle α and the reflection angle β of which closely resemble each other identified at Step S24 in addition to the emphasis correction described above, or in place of the emphasis correction described above. Accordingly, at Step S26, the image M may be depicted using only the ultrasonic signal S the incidence angle α and the reflection angle β of which closely resemble each other.

As described above, in the fourth embodiment, it is possible to identify the ultrasonic signal S the incidence angle α and the reflection angle β of which with respect to the surface 1a (concavo-convex surface 2A) of the piping 1 closely resemble each other, that is, a strong ultrasonic signal S among the ultrasonic signals S transmitted from one probe 110 and received by the other probe 110. The image M can be created by applying emphasis correction to the data of the identified strong ultrasonic signal S. As a result, the surface 1a (concavo-convex surface 2A) of the piping 1 including the vicinity of the end part can be depicted with higher accuracy at the primary depicting step, and the surface shape can be identified with higher accuracy at the subsequent shape identifying step.

Alternatively, after the processing from Step S21 to Step S24 illustrated in FIG. 11 is performed, and the ultrasonic signal S the incidence angle α and the reflection angle β of which closely resemble each other is identified, the data collection step at Step S1 illustrated in FIG. 3 may be performed again using only the probe 110 that transmits/receives the ultrasonic signal S, and collected pieces of data of the ultrasonic signal S may be synthesized to depict the image M.

Fifth Embodiment

Figure 14:
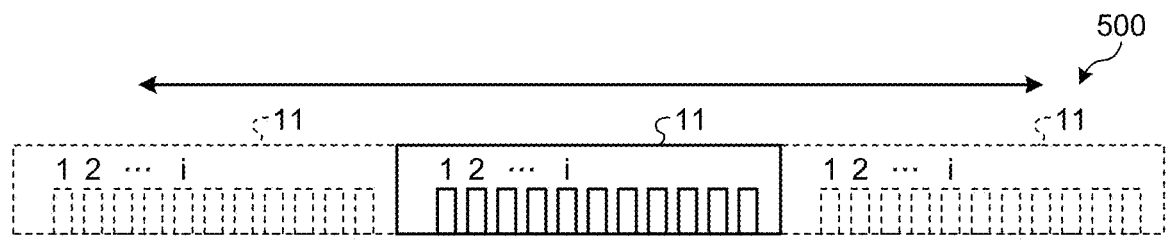
FIG. 14 is an explanatory diagram schematically illustrating a principal part of an ultrasonic inspection device and an ultrasonic inspection method according to a fifth embodiment.
Figure 14:

Next, the following describes the ultrasonic inspection device and the ultrasonic inspection method according to a fifth embodiment. FIG. 14 is an explanatory diagram schematically illustrating a principal part of the ultrasonic inspection device and the ultrasonic inspection method according to the fifth embodiment. In the ultrasonic inspection device 500 according to the fifth embodiment, as illustrated in FIG. 14, the linear array probe 11 can freely move along all directions of the surface 1a. Other components of the ultrasonic inspection device 500 are the same as those of the ultrasonic inspection device 100, so that redundant description will not be repeated. The following describes a case in which the linear array probe 11 moves along all direction of the surface 1a.

In the fifth embodiment, as illustrated in FIG. 14, the length of the linear array probe 11 is assumed to be shorter than that of the concavo-convex surface 2A of the piping 1 in the extending direction. As represented by a dashed line and a solid line arrow in FIG. 14, a user moves the linear array probe 11 multiple times along the extending direction of the surface 1a to cover a range of the concavo-convex surface 2A. The ultrasonic inspection device 500 includes a device (not illustrated) that moves the linear array probe 11 along the extending direction, and the control unit 21 causes the device (not illustrated) to be driven in accordance with an instruction from the user to move the linear array probe 11.

The coordinates of the probes 110 following movement of the linear array probe 11 are calculated based on a movement amount of the linear array probe 11. The movement amount of the linear array probe 11 may be measured using any method. For example, the movement amount from an initial position may be measured by using an encoder (not illustrated), or the movement amount may be calculated by using image processing while photographing the linear array probe 11 with a photographing device (camera). The probes 110 may be caused to be freely movable in the linear array probe 11, and only the probes 110 may be moved along the extending direction. In this case, the length of the linear array probe 11 itself needs to cover the range of the concavo-convex surface 2A.

In the fifth embodiment, each time the linear array probe 11 is moved, the calculation unit 20 performs the data collection step at Step S1 and the data synthesis step from Step S2 to Step S5 illustrated in FIG. 3. Due to this, a calculation result depicting an inner part of the piping 1 is obtained for each movement position of the linear array probe 11. By synthesizing all calculation results obtained for respective movement positions of the linear array probe 11, the calculation unit 20 can obtain a depicting result of the inner part of the piping 1 obtained by synthesizing all calculation results for a moving range of the linear array probe 11.

With this configuration, the piping 1 can be inspected by accumulating calculation results of the data collection step and the data synthesis step that are performed multiple times while moving the entire probes 110. That is, even when the length of the linear array probe 11 is shorter than that of the concavo-convex surface 2A of the piping 1 in the extending direction, the surface shape of the piping 1 including the end part of the concavo-convex surface 2A can be identified with higher accuracy, and the depicting result of the inner part of the piping 1 can be obtained with high accuracy based on the identified surface shape.

As described above, the fifth embodiment describes a form of inspecting the piping 1 by accumulating the calculation results of the data collection step and the data synthesis step that are performed multiple times while moving the entire probes 110. Alternatively, by moving a single probe multiple times, the data collection step may be performed for each movement, and a calculation result obtained by accumulating collected pieces of data may be acquired at the data synthesis step.

Sixth Embodiment

Figure 15:
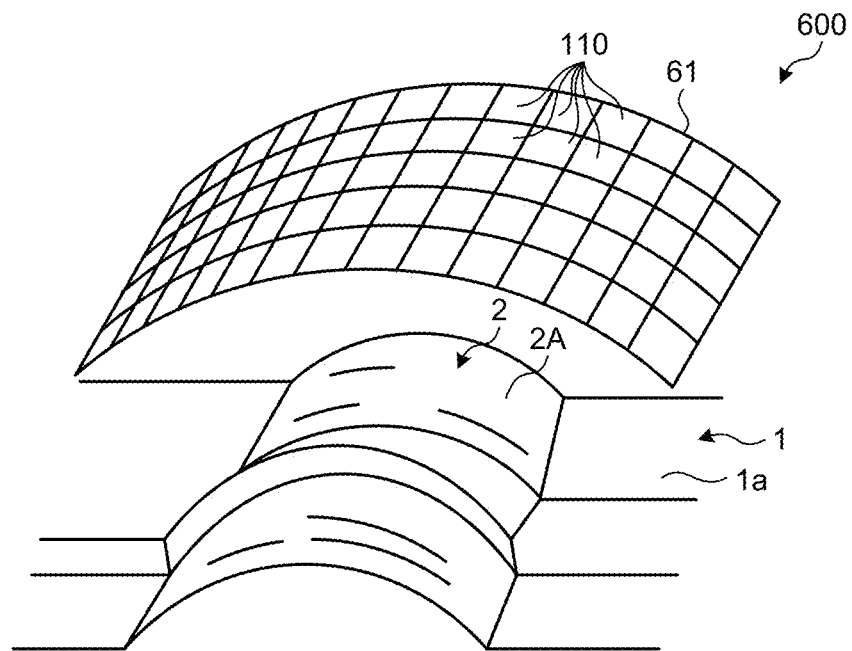
FIG. 15 is an explanatory diagram schematically illustrating a principal part of an ultrasonic inspection device according to a sixth embodiment.

Next, the following describes the ultrasonic inspection device and the ultrasonic inspection method according to a sixth embodiment. FIG. 15 is an explanatory diagram schematically illustrating a principal part of the ultrasonic inspection device according to the sixth embodiment. The first embodiment to the fifth embodiment mainly describe the calculation processing utilizing the linear array probe 11 (and the linear array probe 41) in which the probes 110 are arranged on a two-dimensional plane. As illustrated in FIG. 15, an ultrasonic inspection device 600 illustrated in FIG. 15 includes a matrix array probe 61 in which the probes 110 are arranged in a matrix array on a three-dimensional plane. The other device configuration of the ultrasonic inspection device 600 is the same as that in the first embodiment, so that redundant description will not be repeated.

In the matrix array probe 61, N probes 110 are arranged in N lines. Thus, when the data collection step at Step S1 illustrated in FIG. 3 is performed using the matrix array probe 61, N×N pieces of matrix data are collected for each line for the ultrasonic signal S. That is, each of all the probes 110 collects N×N×N pieces of data, and the N×N×N pieces of data for the ultrasonic signal S are data obtained by scanning the piping 1 with the ultrasonic signal S.

In the sixth embodiment, the calculation unit 20 performs the data collection step at Step S1 and the data synthesis step from Step S2 to Step S5 illustrated in FIG. 3 using the N×N×N pieces of data for the ultrasonic signal S described above. With this configuration, the data collection step at Step S1 and the data synthesis step from Step S2 to Step S5 can be performed in a three-dimensional space, and the depicting result of the inner part of the piping 1 can be obtained for a larger range with high accuracy.

The configurations according to the second embodiment to the sixth embodiment described above may be implemented at the same time.

An ultrasonic inspection method according to an aspect of the present invention is an ultrasonic inspection method of scanning and inspecting an inspection object with ultrasonic waves. The method includes collecting pieces of data obtained by scanning the inspection object with ultrasonic signals by using a plurality of probes configured to transmit the ultrasonic signals to the inspection object and receive the ultrasonic signals reflected from the inspection object via a medium that propagates the ultrasonic signals; and processing and synthesizing the collected pieces of data of the ultrasonic signals. Synthesizing the data includes depicting an image including a surface of the inspection object in a region including a plurality of pixels partitioned in a grid-like fashion based on the collected pieces of data of the ultrasonic signals, and extracting a pixel having maximum pixel intensity from the pixels arranged along a direction perpendicular to an extending direction of the surface of the inspection object in the depicted image to identify a position of the extracted pixel as a surface shape of the inspection object.

With this configuration, the surface shape of the inspection object can be identified only by creating an image not including the entire inspection object but including the surface thereof, and extracting a pixel indicating the maximum pixel intensity from the created image. Thus, complicated processing is not required for identifying the surface shape of the inspection object.

It is preferable that depicting the image includes depicting the image in a predetermined range that defines a range including the surface of the inspection object in advance.

With this configuration, the image including the surface can be created while excluding ultrasonic signals reflected from a position different from the surface of the inspection object (that is, an inner part of the inspection object), so that calculation accuracy can be improved.

It is preferable that extracting the pixel to identify the position of the extracted pixel includes extracting pixels having the pixel intensity equal to or larger than a predetermined threshold from the pixels having maximum pixel intensity.

With this configuration, the surface of the inspection object having pixel intensity smaller than the predetermined threshold is estimated as a position at which the ultrasonic signals are reflected to the outside of ranges of the probes and do not enter the inner part of the inspection object, and the surface position can be excluded from being used for identifying the surface shape. As a result, in performing processing after the identified surface shape is used, the processing can be performed without using unnecessary position data of the surface shape, so that the calculation load can be further reduced.

It is preferable that synthesizing the data includes calculating a position at which a propagation time of the ultrasonic signal from the probe to a certain one of the pixels is minimized on the identified surface shape to set a path passing through the calculated position on the surface shape to be a propagation path of the ultrasonic signal, and synthesizing amplitude values of the collected pieces of data of the ultrasonic signals such that a pixel and a timing at which the amplitude value is increased are matched with each other based on the calculated propagation path.

With this configuration, a result of reflected waveforms of the ultrasonic signals can be obtained by synthesizing the amplitude values such that the position and the timing at which the ultrasonic signals transmitted from the respective probes are reflected in the inner part of the inspection object (at which the amplitude value is increased) are matched with each other. Due to this, a position of an internal defect of the inspection object can be detected. By using a data group of the acquired ultrasonic signals, the processing can be successively performed after the surface shape of the inspection object is identified, so that real-time performance of inspection can be improved.

It is preferable that in a state where a transmission and reception surface for the ultrasonic signal formed along an arrangement direction of the probes is curved along the identified surface shape, collecting the data, depicting the image, and extracting the pixel to identify the position of the extracted pixel are performed again.

With this configuration, the transmission and reception surface formed of the probes is curved along the identified surface shape of the inspection object, so that the probes arranged at an end part can capture reflected waves of a larger number of ultrasonic signals. As a result, at identifying the shape to be performed again, the surface shape at the end part can be identified with higher accuracy.

It is preferable that extracting the pixel to identify the position of the extracted pixel includes setting the pixel intensity to have continuous values along a direction perpendicular to the extending direction, and extracting the pixel having the maximum pixel intensity based on values obtained by applying a differential filter to the continuous values, and the differential filter is a differential filter having higher sensitivity on an end part of a concavo-convex surface formed by the surface than that on a center part.

With this configuration, at the end part of the surface shape, the pixel having the maximum pixel intensity can be identified with high accuracy based on the value obtained by applying the differential filter having higher sensitivity to the continuous value of the pixel intensity. As a result, the surface shape of the inspection object can be identified with higher accuracy.

It is preferable that, depicting the image includes estimating a tilt angle of the surface of the inspection object based on coordinates of the probe that has transmitted and received the strongest ultrasonic signal and transmission and reception time of the strongest ultrasonic signal for each of the pixels, calculating an incidence angle and a reflection angle of the ultrasonic signal with respect to the surface based on the estimated tilt angle for each of the pixels, and depicting the image by applying emphasis correction to data of the ultrasonic signal the incidence angle and the reflection angle of which closely resemble each other.

With this configuration, it is possible to identify the ultrasonic signal the incidence angle and the reflection angle of which with respect to the surface of the inspection object closely resemble each other, that is, a strong ultrasonic signal among ultrasonic signals transmitted from one probe and received by the other probe. The image can be created by applying emphasis correction to data of the identified strong ultrasonic signal. As a result, the surface of the inspection object can be depicted with higher accuracy at depicting the image, and the surface shape can be identified with higher accuracy with higher accuracy at specifying the shape to be performed subsequently.

An ultrasonic inspection device according to another aspect of the present invention is an ultrasonic inspection device that scans and inspects an inspection object with ultrasonic waves. The device includes a plurality of probes configured to transmit ultrasonic signals to the inspection object and receive the ultrasonic signals reflected from the inspection object via a medium that propagates the ultrasonic signals; and an arithmetic processing unit configured to perform data collection processing of collecting pieces of data obtained by scanning the inspection object with the ultrasonic signals by using the probes, and data synthesis processing of processing and synthesizing the pieces of data of the ultrasonic signals collected in the data collection processing. The arithmetic processing unit performs primary depicting processing of depicting an image including a surface of the inspection object in a region including a plurality of pixels partitioned in a grid-like fashion based on the data of the ultrasonic signals collected in the data collection processing, and shape identifying processing of extracting a pixel having maximum pixel intensity from the pixels arranged along a direction perpendicular to an extending direction of the surface of the inspection object in the image depicted in the primary depicting processing to identify a position of the extracted pixel as a surface shape of the inspection object.

With this configuration, the surface shape of the inspection object can be identified only by creating an image not including the entire inspection object but including the surface thereof, and extracting a pixel indicating the maximum pixel intensity from the created image. Thus, complicated processing is not required for identifying the surface shape of the inspection object.

It is preferable that the arithmetic processing unit further performs path calculation processing of calculating a position at which a propagation time of the ultrasonic signal from the probe to a certain one of the pixels is minimized on the surface shape identified in the shape identifying processing to set a path passing through the calculated position on the surface shape to be a propagation path of the ultrasonic signal, and amplitude value synthesis processing of synthesizing amplitude values of the data of the ultrasonic signals collected in the data collection processing such that a pixel and a timing at which the amplitude value is increased are matched with each other based on the propagation path calculated in the path calculation processing.

With this configuration, a result of reflected waveforms of the ultrasonic signals can be obtained by synthesizing the amplitude values such that the position and the timing at which the ultrasonic signals transmitted from the respective probes are reflected in the inner part of the inspection object (at which the amplitude value is increased) are matched with each other. Due to this, a position of an internal defect of the inspection object can be detected. By using a data group of the acquired ultrasonic signals, the processing can be successively performed after the surface shape of the inspection object is identified, so that real-time performance of inspection can be improved.

The arithmetic processing unit can improve a calculation speed by using a General-Purpose Computing On Graphics Processing Unit (GPGPU). At least one GPU is required, but a plurality of GPUs can be used in parallel.

It is preferable that the arithmetic processing unit performs the data collection processing, the primary depicting processing, and the shape identifying processing again in a state in which a transmission and reception surface formed of the probes is curved along the surface shape identified in the shape identifying processing.

With this configuration, the transmission and reception surface formed of the probes is curved along the surface shape of the inspection object identified in the shape identifying processing, so that the probe arranged at the end part can capture reflected waves of a larger number of ultrasonic signals. As a result, in the shape identifying processing to be performed again, the surface shape at the end part can be identified with higher accuracy.

It is preferable that the shape identifying processing includes setting the pixel intensity to have continuous values along a direction perpendicular to the extending direction, and extracting the pixel having the maximum pixel intensity based on values obtained by applying a differential filter to the continuous values, and the differential filter is a differential filter having higher sensitivity on an end part of a concavo-convex surface formed by the surface than that on a center part.

With this configuration, at the end part of the surface shape, the pixel having the maximum pixel intensity can be identified with high accuracy based on the value obtained by applying the differential filter having higher sensitivity to the continuous value of the pixel intensity. As a result, the surface shape of the inspection object can be identified with higher accuracy.

It is preferable that the shape identifying processing includes setting the pixel intensity to have continuous values along a direction perpendicular to the extending direction, and extracting the pixel having the maximum pixel intensity based on values obtained by applying a differential filter to the continuous values, and the differential filter is a differential filter having higher sensitivity on an end part of a concavo-convex surface formed by the surface than that on a center part.

With this configuration, it is possible to identify the ultrasonic signal the incidence angle and the reflection angle of which with respect to the surface of the inspection object closely resemble each other, that is, a strong ultrasonic signal among the ultrasonic signals transmitted from one probe and received by the other probe. The image can be created by applying emphasis correction to the data of the identified strong ultrasonic signal. As a result, the surface of the inspection object can be depicted with higher accuracy at depicting the image, and the surface shape can be identified with higher accuracy at specifying the shape to be performed subsequently.

A non-transitory computer-readable storage medium according to still another aspect of the present invention stores an executable program to be executed by a computer. The program includes collecting pieces of data obtained by scanning an inspection object with ultrasonic signals by using a plurality of probes configured to transmit the ultrasonic signals to the inspection object and receive the ultrasonic signals reflected from the inspection object via a medium that propagates the ultrasonic signals; and processing and synthesizing the collected pieces of data of the ultrasonic signals. Synthesizing the data includes depicting an image including a surface of the inspection object in a region including a plurality of pixels partitioned in a grid-like fashion based on the collected pieces of data of the ultrasonic signals, and extracting a pixel having maximum pixel intensity from the pixels arranged along a direction perpendicular to an extending direction of the surface of the inspection object in the depicted image to identify a position of the extracted pixel as a surface shape of the inspection object.

With this configuration, the surface shape of the inspection object can be identified only by creating an image not including the entire inspection object but including the surface thereof, and extracting a pixel indicating the maximum pixel intensity from the created image. Thus, complicated processing is not required for identifying the surface shape of the inspection object.

While certain embodiments have been described, these embodiments are not intended to limit the scope of the inventions. The components in the embodiments include ones that a person skilled in the art can easily conceive of, ones that are substantially the same, or ones that fall within their equivalents. Furthermore, various omissions, substitutions, combinations, and changes may be made as appropriate to configurations of the components disclosed in the embodiments without departing from the spirit of the inventions.

What is claimed is:

1. An ultrasonic inspection method of scanning and inspecting an inspection object with ultrasonic waves, the method comprising:
    collecting pieces of data obtained by scanning the inspection object with ultrasonic signals by using a plurality of probes configured to transmit the ultrasonic signals to the inspection object and receive the ultrasonic signals reflected from the inspection object via a medium that propagates the ultrasonic signals; and
    processing and synthesizing the collected pieces of data of the ultrasonic signals, wherein
    synthesizing the data includes
        depicting an image including not the entire inspection object, but instead only one surface of the inspection object in a region including a plurality of pixels partitioned in a grid-like fashion based on the collected pieces of data of the ultrasonic signals, and
        extracting a pixel having maximum pixel intensity from the pixels arranged along a direction perpendicular to an extending direction of the surface of the inspection object in the depicted image to identify a position of the extracted pixel as a surface shape of the inspection object.

2. The ultrasonic inspection method according to claim 1, wherein depicting the image includes depicting the image in a predetermined range that defines a range including the surface of the inspection object in advance.

3. The ultrasonic inspection method according to claim 1, wherein extracting the pixel to identify the position of the extracted pixel includes extracting pixels having the pixel intensity equal to or larger than a predetermined threshold from the pixels having maximum pixel intensity.

4. The ultrasonic inspection method according to claim 1, wherein
    synthesizing the data includes
        calculating a position at which a propagation time of the ultrasonic signal from the probe to a certain one of the pixels is minimized on the identified surface shape to set a path passing through the calculated position on the surface shape to be a propagation path of the ultrasonic signal, and
        synthesizing amplitude values of the collected pieces of data of the ultrasonic signals such that a pixel and a timing at which the amplitude value is increased are matched with each other based on the calculated propagation path.

5. The ultrasonic inspection method according to claim 1, wherein in a state where a transmission and reception surface for the ultrasonic signal formed along an arrangement direction of the probes is curved along the identified surface shape, collecting the data, depicting the image, and extracting the pixel to identify the position of the extracted pixel are performed again.

6. The ultrasonic inspection method according to claim 1, wherein
    extracting the pixel to identify the position of the extracted pixel includes
        setting the pixel intensity to have continuous values along a direction perpendicular to the extending direction, and
        extracting the pixel having the maximum pixel intensity based on values obtained by applying a differential filter to the continuous values, and
    the differential filter is a differential filter having higher sensitivity on an end part of a concavo-convex surface formed by the surface than that on a center part.

7. The ultrasonic inspection method according to claim 1, wherein,
    depicting the image includes
        estimating a tilt angle of the surface of the inspection object based on coordinates of the probe that has transmitted and received the strongest ultrasonic signal and transmission and reception time of the strongest ultrasonic signal for each of the pixels,
        calculating an incidence angle and a reflection angle of the ultrasonic signal with respect to the surface based on the estimated tilt angle for each of the pixels, and depicting the image by applying emphasis correction to data of the ultrasonic signal the incidence angle and the reflection angle of which closely resemble each other.

8. An ultrasonic inspection device that scans and inspects an inspection object with ultrasonic waves, the device comprising:
a plurality of probes configured to transmit ultrasonic signals to the inspection object and receive the ultrasonic signals reflected from the inspection object via a medium that propagates the ultrasonic signals; and
an arithmetic processing unit configured to perform data collection processing of collecting pieces of data obtained by scanning the inspection object with the ultrasonic signals by using the probes, and data synthesis processing of processing and synthesizing the pieces of data of the ultrasonic signals collected in the data collection processing, wherein
the arithmetic processing unit performs
primary depicting processing of depicting an image including not the entire inspection object, but instead only one surface of the inspection object in a region including a plurality of pixels partitioned in a grid-like fashion based on the data of the ultrasonic signals collected in the data collection processing, and
shape identifying processing of extracting a pixel having maximum pixel intensity from the pixels arranged along a direction perpendicular to an extending direction of the surface of the inspection object in the image depicted in the primary depicting processing to identify a position of the extracted pixel as a surface shape of the inspection object.

9. The ultrasonic inspection device according to claim 8, wherein
the arithmetic processing unit further performs
path calculation processing of calculating a position at which a propagation time of the ultrasonic signal from the probe to a certain one of the pixels is minimized on the surface shape identified in the shape identifying processing to set a path passing through the calculated position on the surface shape to be a propagation path of the ultrasonic signal, and
amplitude value synthesis processing of synthesizing amplitude values of the data of the ultrasonic signals collected in the data collection processing such that a pixel and a timing at which the amplitude value is increased are matched with each other based on the propagation path calculated in the path calculation processing.

10. The ultrasonic inspection device according to claim 8, wherein the arithmetic processing unit performs the data collection processing, the primary depicting processing, and the shape identifying processing again in a state in which a transmission and reception surface formed of the probes is curved along the surface shape identified in the shape identifying processing.

11. The ultrasonic inspection device according to claim 8, wherein,
the shape identifying processing includes
setting the pixel intensity to have continuous values along a direction perpendicular to the extending direction, and
extracting the pixel having the maximum pixel intensity based on values obtained by applying a differential filter to the continuous values, and
the differential filter is a differential filter having higher sensitivity on an end part of a concavo-convex surface formed by the surface than that on a center part.

12. The ultrasonic inspection device according to claim 8, wherein,
the primary depicting processing includes
estimating a tilt angle of the surface of the inspection object based on coordinates of the probe that has transmitted and received the strongest ultrasonic signal and transmission and reception time of the strongest ultrasonic signal for each of the pixels,
calculating an incidence angle and a reflection angle of the ultrasonic signal with respect to the surface based on the estimated tilt angle for each of the pixels, and
depicting the image by applying emphasis correction to data of the ultrasonic signal the incidence angle and the reflection angle of which closely resemble each other.

13. A non-transitory computer-readable storage medium on which an executable program to be executed by a computer is stored, the program comprising:
collecting pieces of data obtained by scanning an inspection object with ultrasonic signals by using a plurality of probes configured to transmit the ultrasonic signals to the inspection object and receive the ultrasonic signals reflected from the inspection object via a medium that propagates the ultrasonic signals; and
processing and synthesizing the collected pieces of data of the ultrasonic signals, wherein
synthesizing the data includes
depicting an image including not the entire inspection object, but instead only one surface of the inspection object in a region including a plurality of pixels partitioned in a grid-like fashion based on the collected pieces of data of the ultrasonic signals, and
extracting a pixel having maximum pixel intensity from the pixels arranged along a direction perpendicular to an extending direction of the surface of the inspection object in the depicted image to identify a position of the extracted pixel as a surface shape of the inspection object.

* * * * *